(12) United States Patent
Ohki et al.

(10) Patent No.: US 7,809,414 B2
(45) Date of Patent: Oct. 5, 2010

(54) PORTABLE INFORMATION TERMINAL, OPENING/CLOSING OPERATION METHOD, AND DISPLAY METHOD

(75) Inventors: Kunihiro Ohki, Kyoto (JP); Hidenori Takata, Kure (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 869 days.

(21) Appl. No.: 11/302,211

(22) Filed: Dec. 14, 2005

(65) Prior Publication Data

US 2007/0135181 A1 Jun. 14, 2007

(51) Int. Cl.
*H04M 1/00* (2006.01)
*H04B 1/38* (2006.01)
*H04B 1/08* (2006.01)
*F16B 45/00* (2006.01)

(52) U.S. Cl. ............... 455/575.4; 455/575.1; 455/90.3; 455/347; 248/307

(58) Field of Classification Search ............ 455/575.1, 455/575.3, 575.4, 575.7, 566, 90.3, 347; 248/307
See application file for complete search history.

(56) References Cited

U.S. PATENT DOCUMENTS

| | | | |
|---|---|---|---|
| 6,477,040 B2 | 11/2002 | Horiki | |
| 7,158,816 B1 | 1/2007 | Mizuta et al. | |
| 7,203,533 B1 * | 4/2007 | Tischer | 455/575.8 |
| 7,308,290 B2 * | 12/2007 | Johnson et al. | 455/575.1 |
| 7,400,913 B2 * | 7/2008 | Richter et al. | 455/575.1 |
| 7,496,389 B2 * | 2/2009 | Cho et al. | 455/575.4 |
| 2002/0102946 A1 | 8/2002 | SanGiovanni | |
| 2003/0142081 A1 | 7/2003 | Iizuka et al. | |
| 2004/0266477 A1 | 12/2004 | Murata | |

FOREIGN PATENT DOCUMENTS

| | | |
|---|---|---|
| EP | 1427172 A2 | 6/2004 |
| EP | 1594293 A2 | 11/2005 |
| JP | 8-256080 A | 10/1996 |
| JP | 2000-332870 A | 11/2000 |
| JP | 2002-163036 A | 6/2002 |
| JP | 2002-209000 A | 7/2002 |
| JP | 2002-244764 A | 8/2002 |
| JP | 2002-344592 A | 11/2002 |
| JP | 2003-44199 A | 2/2003 |

(Continued)

*Primary Examiner*—Un C Cho
*Assistant Examiner*—George Eng
(74) *Attorney, Agent, or Firm*—Birch, Stewart, Kolasch & Birch, LLP

(57) ABSTRACT

A portable information terminal includes a first casing having a manipulation unit at its surface, a second casing having a display unit at its surface, and a rotation link mechanism linking the first casing and the second casing such that the second casing rotates slidably with respect to the first casing. The rotation link mechanism is configured to allow transition, by one rotating operation, from one to another of a closed state in which the second casing entirely covers the manipulation unit of the first casing and an open state in which the manipulation unit of the first casing is exposed as a result of movement of the second casing that takes an axially symmetric orientation to the center line of the first casing in the open state. Thus, the operation from a closed state up to an open state can all be readily conducted with one hand.

2 Claims, 42 Drawing Sheets

FOREIGN PATENT DOCUMENTS

| | | |
|---|---|---|
| JP | 2003-296015 A | 10/2003 |
| JP | 2003-304316 A | 10/2003 |
| JP | 2003-319043 A | 11/2003 |
| JP | 2003-337635 A | 11/2003 |
| JP | 2003-338866 A | 11/2003 |
| JP | 2004-56385 A | 2/2004 |
| JP | 2005-109971 * | 4/2005 |
| WO | WO-03/050665 A1 | 6/2003 |

* cited by examiner

PORTABLE INFORMATION TERMINAL, OPENING/CLOSING OPERATION METHOD, AND DISPLAY METHOD

This nonprovisional application is based on Japanese Patent Application No. 2004-194257 filed with the Japan Patent Office on Jun. 30, 2004, the entire contents of which are hereby incorporated by reference.

BACKGROUND OF THE INVENTION

1. Field of the Invention

The present invention relates to a portable information terminal, an opening/closing operation method of such a portable information terminal, and a display method thereof.

2. Description of the Background Art

The technique of changing the portrait orientation of the display to a landscape orientation in a conventional portable information terminal such as a mobile phone is disclosed in Japanese Patent Laying-Open No. 2003-319043, for example. Referring to FIG. 57 showing such a mobile phone, this mobile phone 510 includes a lower unit 501, an upper unit 502, and a hinge 503. Lower and upper units 501 and 502 are coupled in a foldable manner via hinge 503. Lower unit 501 includes a manipulation unit 511 with various keys. Upper unit 502 includes a display unit 502a with a display 521, and a support unit 502b supporting display unit 502a in a rotation manner.

Mobile phone 510 attains an open state (FIG. 57 (a)) by rotation of upper unit 502 about hinge 503 relative to lower unit 501 from a closed state in which lower and upper units 501 and 502 are folded with respect to each other (not shown). In the open state, display 521 corresponds to a portrait orientation (a display longer in the vertical direction). By rotating display unit 502a relative to support unit 502b from the open state (FIG. 57 (a)), display unit 521 can take a landscape orientation (a display longer in the horizontal direction) (FIG. 57 (b)-(d)).

Mobile phone 510 disclosed in the aforementioned publication requires two rotating operations in order to set display 521 in a landscape orientation from the folded state of lower and upper units 501 and 502. Specifically, the operation of rotating upper unit 502 relative to lower unit 501, and the operation of rotating display unit 502a relative to support unit 502b are required. There was a problem that such operation is tedious. In an open state (FIG. 57 (a)), the user holds lower unit 501 with his/her hand, and display unit 502a is supported rotatably with respect to support unit 502b. In the case where the operator is to rotate display unit 502a to attain a landscape orientation using his/her hand that is currently holding lower unit 501, the finger of the user's hand holding lower unit 501 must be stretched towards support unit 502b. Since the operator cannot easily stretch his/her finger in order to rotate display unit 502a 90°, the shifting operation to a landscape orientation cannot be completed by just one operation of the operator. This is inconvenient since the user cannot complete the shifting operation to a landscape display with just one hand.

There was also the problem that it was difficult to adjust the sensitivity of the antenna of the portable information terminal.

SUMMARY OF THE INVENTION

An object of the present invention is to provide a portable information terminal that allows the operation from a closed state to an open state to be carried out easily with one hand, an opening/closing operation method of such a portable information terminal, and a display method thereof.

Another object of the present invention is to provide a portable information terminal that can have the sensitivity of the antenna easily adjusted.

According to a first aspect of the present invention, a portable information terminal includes a first casing having a manipulation unit at its surface, a second casing having a display at its surface, and a rotation link mechanism linking the first and second casings such that the second casing rotates slidably with respect to the first casing. The rotation link mechanism is configured to allow transition, by one rotating operation, from one to another of a closed state in which the second casing entirely covers the manipulation unit of the first casing and an open state in which the manipulation unit of the first casing is exposed as a result of movement of the second casing that takes an axially symmetric orientation to the center line of the first casing in the open state.

In accordance with the portable information terminal of the first aspect, transition to an open state (display in landscape orientation) is facilitated since transition from one state to another state, i.e. between a closed state and an open state, can be effected by one rotating operation.

Since the first casing has the manipulation unit provided at its surface, the user can operate the manipulation unit of the first casing while holding the first casing with one hand. Further, since the second casing is linked to the first casing that is held by the user, the second casing can be moved to an open state by the user just stretching his/her finger of the hand that is holding the portable information terminal. The shifting operation can be effected with one hand.

Since the second casing that rotates slidably is directly supported on the first casing, the portable information terminal can be readily reduced in size.

Since the second casing is axially symmetric with respect to the center line of the first casing in an open state, the ease of viewing the display unit of the second unit while holding the first casing can be ensured.

According to a second aspect of the present invention, a portable information terminal includes a first casing having a manipulation unit at its surface, a second casing having a display unit at its surface, and a rotation link mechanism linking the first and second casings such that the second casing rotates slidably with respect to the first casing. The first casing and the second casing have the same rectangular shape. The rotation center of the rotation link mechanism is located on a phantom line that passes through a point distant from a corner of the first and second casings along each longer side by a distance x obtained by the equation of $x=(b-a)/2$, where a is the length of the shorter side of the first and second casings and b is the length of the longer side of the first and second casings, and that crosses the longer side by an angle of 45°.

In accordance with the portable information terminal of the second aspect, the manipulation unit of the first casing is exposed as a result of movement of the second casing that takes an axially symmetric orientation about the center line of the first casing in an open state since the rotation center of the rotation link mechanism is located on the phantom line set forth above.

Transition to an open state (display in landscape orientation) is facilitated since transition from one state to another state, i.e. between a closed state and an open state, can be effected by one rotating operation.

Since the first casing has the manipulation unit provided at its surface, the user can operate the manipulation unit of the first casing while holding the first casing with one hand.

Further, since the second casing is linked to the first casing that is held by the user, the user can move the second casing to an open state by just slightly stretching the finger of his/her hand holding the portable information terminal. The shifting operation can be effected by one hand.

Since the second casing that rotates slidably is directly supported on the first casing, the portable information terminal can be readily reduced in size.

Further, since the second casing is axially symmetric with respect to the center line of the first casing in an open state, the ease of viewing the display unit of the second unit while holding the first casing can be ensured.

According to a third aspect of the present invention, a portable information terminal includes a first casing having a manipulation unit at its surface, a second casing having a display unit at its surface, and a rotation link mechanism linking the first and second casings such that the second casing rotates slidably with respect to the first casing. The rotation link mechanism is configured to allow transition from a closed state in which the second casing entirely covers the manipulation unit of the first casing to an open state in which the manipulation unit of the first casing is exposed as a result of movement of the second casing that takes an axially symmetric orientation to the center line of the first casing in the open state, regardless of to which side of the first casing the second casing is rotated slidably by the same angle of rotation.

In accordance with the portable information terminal of the third aspect, the opening/closing operation can be conducted in a similar manner for both a right-handed user and a left-handed user since transition to an open state is allowed by rotating slidably the second casing by the same angle of rotation relative to either side of the first casing.

Transition to an open state (display in landscape orientation) is facilitated since transition from one state to another state, i.e. between a closed state and an open state, can be effected by one rotating operation.

Since the first casing has the manipulation unit provided at its surface, the user can operate the manipulation unit of the first casing while holding the first casing with one hand. Further, since the second casing is linked to the first casing that is held by the user, the second casing can be moved to an open state by the user just stretching his/her finger of the hand that is holding the portable information terminal. The shifting operation can be effected with one hand.

Since the second casing that rotates slidably is directly supported on the first casing, the portable information terminal can be readily reduced in size.

Since the second casing is axially symmetric with respect to the center line of the first casing in an open state, the ease of viewing the display unit of the second unit while holding the first casing can be ensured.

According to a fourth aspect of the present invention, a portable information terminal includes a first casing having a manipulation unit at its surface, a second casing having a display unit at its surface, and a rotation link mechanism linking the first and second casings such that the second casing rotates slidably with respect to the first casing. A rotation shaft unit, of the rotation link mechanism is located at a side face of the first and second casings, and another manipulation unit is arranged in the rotation shaft unit.

In accordance with the portable information terminal of the fourth aspect, an additional region for arranging another manipulation unit is not required since the additional manipulation unit is arranged in the rotation shaft unit of the rotation link mechanism. This is advantageous from the standpoint of reducing the size of the portable information terminal.

Since the second casing that rotates slidably is directly supported on the first casing, the portable information terminal can be readily reduced in size.

Preferably, the portable information terminal according to the first to fourth aspects set forth above further includes an antenna for television broadcast reception such as a diversity type antenna.

Accordingly, television broadcasting can be enjoyed through the portable information terminal. The antenna of the diversity system includes a plurality of antennas, directed to using the signal of an antenna that is superior in radio wave in priority, or synthesizing the received signal to remove noise. Therefore, reception stability can be improved.

According to a fifth aspect of the present invention, a portable information terminal includes a first casing having a manipulation unit at its surface, a second casing having a display unit, linked to rotate slidably with respect to the first casing, and a stand member having an antenna at a back side of the first casing. The stand member is configured to allow modification of the angle with respect to the back side of the first casing.

In accordance with the portable information terminal of the fifth aspect, the angle of the stand member can be adjusted appropriately with respect to the backside of the first casing to allow the antenna to be set at a position where the reception sensitivity is most favorable.

Since the portable information terminal can be propped up by means of the stand member, the portable information terminal can be placed on a desk, a board, or the like to allow watching television without having to hold the portable information terminal with one's hand.

Since the second casing that rotates slidably is directly supported on the first casing, the portable information terminal can be readily reduced in size.

Preferably, the portable information terminal according to the first to fifth aspects set forth above further includes a glide pad arranged at the surface of the second casing.

Accordingly, manipulation can be conducted with a natural feel for the user, more conformable to one's sense.

In the portable information terminal according to the first to fifth aspects set forth above, the antenna for television broadcast reception is preferably an antenna for receiving terrestrial digital television broadcast.

Accordingly, a television program based on terrestrial digital broadcast can be watched through the portable information terminal.

The portable information terminal according to the first to fifth aspects set forth above further includes a speaker arranged at both sides of the display unit.

Accordingly, sound can be emitted from both sides of the display unit, likewise a household television. The image on the display unit and the sound from the speakers can be enjoyed with no feeling of strangeness. Further, stereo broadcasting can be accommodated.

Preferably, the portable information terminal according to the first to fifth aspects set forth above further includes a plurality of speakers arranged at one side of the display unit.

Since sound can be emitted from a plurality of speakers located at one side of the display unit, stereo broadcasting can be enjoyed.

Preferably, the portable information terminal according to the first to fifth aspects set forth above further includes a camera arranged at the back side of the first casing.

Accordingly, an image can be taken by the camera while confirming the captured image reproduced on the display unit located at the surface of the second casing.

Preferably, the portable information terminal according to the first to fifth aspects set forth above further includes a flash arranged at the back side of the first casing.

Accordingly, a clear image can be taken even in poor light conditions.

Preferably, the portable information terminal according to the first to fifth aspects set forth above further includes a camera arranged at the surface of the second casing.

Accordingly, a self-portrait can be taken while confirming the image reproduced on the display unit located at the surface of second casing.

Preferably in the portable information terminal according to the first to fifth aspects set forth above, the shutter key of the camera is arranged at a side face of the first casing.

Accordingly, a photograph can be taken in a manner similar to that of a digital camera.

In an opening and closing operation method of a portable information terminal including a first casing having a manipulation unit at its surface, a second casing having a display unit at its surface, and a rotation link mechanism linking the first and second casings such that the second casing rotates slidably with respect to the first casing, the opening and closing operation is conducted by transition, by one rotating slidable operation, from one to another of a closed state in which the second casing entirely covers the manipulation unit of the first casing and an open state in which the manipulation unit of the first casing is exposed as a result of movement of the second casing that takes an axially symmetric orientation to the center line of the first casing in the open state.

According to the opening and closing operation method set forth above, transition to an open state (display in landscape orientation) is facilitated since transition from one state to another state, i.e. between a closed state and an open state, can be effected by one rotating operation.

Since the first casing has the manipulation unit provided at its surface, the user can operate the manipulation unit of the first casing while holding the first casing with one hand. Further, since the second casing is linked to the first casing that is held by the user, the second casing can be moved to an open state by the user just stretching his/her finger of the hand that is holding the portable information terminal. The shifting operation can be effected with one hand.

According to a sixth aspect of the present invention, a portable information terminal includes a casing having a manipulation unit, a display unit, and a link holding mechanism linking the casing and the display unit in a rotation and slidable manner in the direction of the plane of the manipulation unit of the casing, allowing the casing and the display unit to be held in a first holding state in which the casing and the display unit are held in an overlapping manner, and a second holding state in which the casing and the display unit are held in a T shape.

According to a seventh aspect of the present invention, a portable information terminal includes a first casing having a manipulation unit, a second casing having a display unit, and a link holding mechanism linking and holding the first casing and the second casing in a first holding state in which the first and second casings are held in an overlapping manner to allow viewing of the display unit and a second holding state in which the first and second casings are held in a T shape.

According to an eighth aspect of the present invention, a portable information terminal includes a casing of an elongated shape having a manipulation unit, a display unit of a size substantially identical to the size of the casing, and a link holding mechanism linking and holding the casing and the display unit in a first holding state in which the casing and the display unit are held in an overlapping manner and a second holding state in which the casing and the display unit are held in a T shape.

According to a ninth aspect of the present invention, a portable information terminal includes a first casing having a manipulation unit, a second casing having a display unit of an elongated shape, and also a link holding mechanism that allows the display unit of the second casing to be linked and held in a portrait orientation and a landscape orientation with respect to the first casing by rotating slidably the second casing in the direction of the plane of the manipulation unit of the first casing.

In accordance with the portable information terminal according to the sixth to ninth aspects set forth above, transition to an open state (display in landscape orientation) is facilitated since transition from one state to another state, i.e. between a closed state and an open state, can be effected by one rotating operation.

Since the first casing has the manipulation unit provided at its surface, the user can operate the manipulation unit of the first casing while holding the first casing with one hand. Further, since the second casing is linked to the first casing that is held by the user, the second casing can be moved to an open state by the user just stretching his/her finger of the hand that is holding the portable information terminal. The shifting operation can be effected with one hand.

Since the second casing that rotates slidably is directly supported on the first casing, the portable information terminal can be readily reduced in size.

Since the second casing is axially symmetric to the center line of the first casing in an open state, the ease of viewing the display unit of the second casing while holding the first casing can be ensured.

Preferably in the portable information terminal according to the sixth to ninth aspects set forth above, the link holding mechanism includes a lock mechanism that sets locking and cancels the set locking.

Preferably in the portable information terminal according to the sixth to ninth aspects set forth above, display of the display unit is switched corresponding to the portrait orientation or landscape orientation of the display unit.

In a display method of a portable information terminal including a casing having a manipulation unit and an elongated display unit, the display unit is linked and held in a portrait orientation or landscape orientation with respect to the casing by rotating slidably the display unit in the direction of the plane of the manipulation unit of the casing, and display is switched to a portrait orientation or landscape orientation according to the holding state.

In accordance with the display method of the portable information terminal of the present invention, the display can be switched appropriately to a portrait orientation and landscape orientation according to the holding state.

In accordance with the portable information terminal, the opening and closing operation method, and display method set forth above, the operation from a closed state to a landscape display state can be effected readily with one hand.

Further, the sensitivity of the antenna can be adjusted readily in accordance with the portable information terminal of the present invention.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter based on a mobile phone with reference to the drawings.

First Embodiment

Figure 1A:
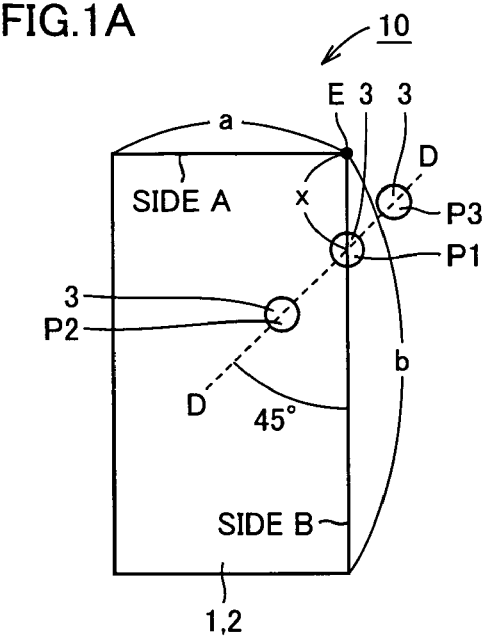
FIGS. 1A and 1B are front views of a portable information terminal according to a first embodiment of the present invention corresponding to a closed state and an open state, respectively.
Figure 1B:
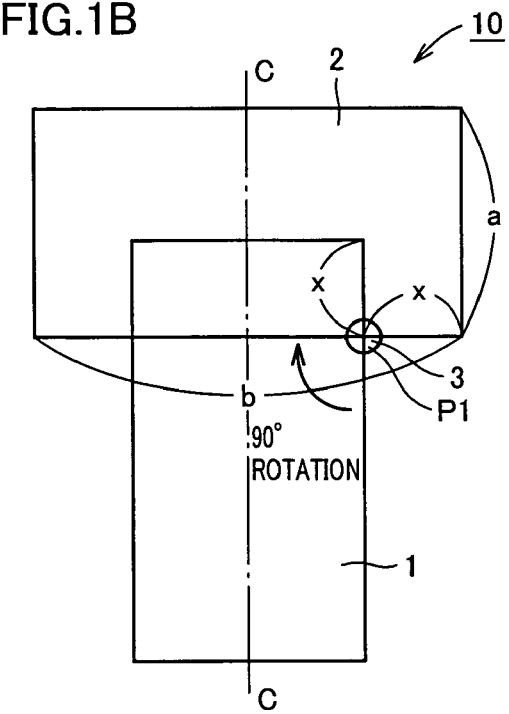

Referring to FIGS. 1A and 1B, a portable information terminal 10 according to a first embodiment of the present invention includes a first casing 1, a second casing 2, and a rotation link mechanism 3.

First casing 1 includes a manipulation unit (not shown) at its surface. Second casing 2 includes a display unit (not shown) at its surface. First and second casings 1 and 2 are directly link through rotation link mechanism 3 such that the surface of first casing 1 (the surface where the manipulation unit such as a keypad is located) faces the back side of second casing 2 (the face opposite to the face where the display unit is located). Rotation link mechanism 3 allows the back side of second casing 2 to be rotated slidably with respect to the surface of first casing.

Rotation link mechanism 3 is configured such that transition from one of the states of a closed state (FIG. 1A) and an open state (FIG. 1B) to the other of the closed state and open state can be effected by one rotating operation. Specifically, in a closed state, the manipulation unit of first casing 1 is completely covered with second casing 2. In an open state, the manipulation unit of first casing 1 is exposed and not concealed by second casing 2, which is positioned axially symmetrical to the center line C-C of first casing 1.

For example, when first and second casings 1 and 2 both have a rectangular shape, and the length of the shorter sides of first and second casings 1 and 2 is a and the length of the longer sides of first and second casings 1 and 2 is b, rotation link mechanism 3 has its rotation center located at a point (for example, any of points P1-P3) on a phantom line D-D that passes through a point on a longer side B by a distance x obtained by the equation of $x=(b-a)/2$, apart from a corner E (the crossing point between shorter side A and longer side B) of first and second casings 1 and 2, and that crosses the longer side B by an angle of 45°.

In the case where the rotation center of rotation link mechanism 3 is set at point P1 located on each longer side B of first and second casings 1 and 2, an open state corresponds to that shown in FIG. 1B. In the case where the rotation center of rotation link mechanism 3 is set at point P2 that is located at the inner side of casings 1 and 2 with respect to longer side B, an open state corresponds to that shown in FIG. 2. In the case where the rotation center of rotation link mechanism 3 is set at point P3 that is located at the outer side of casings 1 and 2 with respect to longer side B, an open state corresponds to that shown in FIG. 3.

In such open states, the portable information terminal preferably takes a T shape for the front shape of first and second casings 1 and 2.

Phantom line D-D set forth above is oblique with respect to a side B so as to cross the opposite side of either side A or B, and cross a prolonged line of side A.

An opening/closing operation of the portable information terminal of the present embodiment will be described hereinafter with reference to FIGS. 1A and 1B.

In a closed state (FIG. 1A), second casing 2 entirely covers the region of the manipulation unit of first casing 1. From this state, second casing 2 is rotated slidably clockwise, for example, in the drawing about the rotation center of rotation link mechanism 3 with respect to first casing 1. Accordingly, second casing 2 is gradually shifted with respect to first casing 1. By rotating second casing 2 90° with respect to first casing 1, the manipulation unit is exposed and no longer concealed by second casing 2, that is now axially symmetric to center line C-C of first casing 1. Thus, portable information terminal 10 attains an open state corresponding to a T shape.

The operation from an open state to a closed state is effected by rotating second casing 2 in a direction opposite to that set forth above (counterclockwise).

As used herein, "rotate slidably" refers to rotating second casing 2 with respect to first casing 1 within a parallel plane between the facing planes of first casing 1 and second casing 2 (the surface of first casing 1 and the back side of second casing 2).

Although the above description is based on the case in which second casing 2 is rotated 90° with respect to first casing 1, the portable information terminal may be configured to allow a rotation of more than 90°. In this case, the portable information terminal is preferably configured to be positioned between a closed state and an open state. For example, positioning may be conducted based on a configuration in which a recess is provided at the region of rotation such that a member of projecting configuration (for example, a sphere) is fitted into the recess by the urge of a spring.

In contrast to the rotation of second casing 2 clockwise from the closed state, second casing 2 may be rotate counterclockwise instead.

Figure 2:
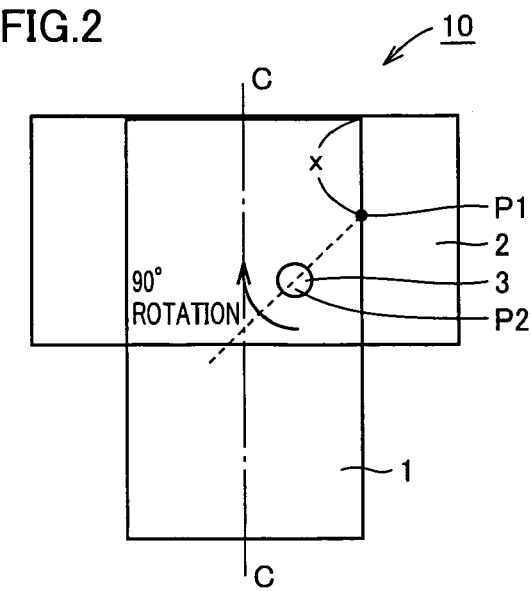
FIG. 2 is a front view of the portable information terminal of the first embodiment corresponding to an open state in which point P2 is taken as the rotation center of the rotation link mechanism.
Figure 3:
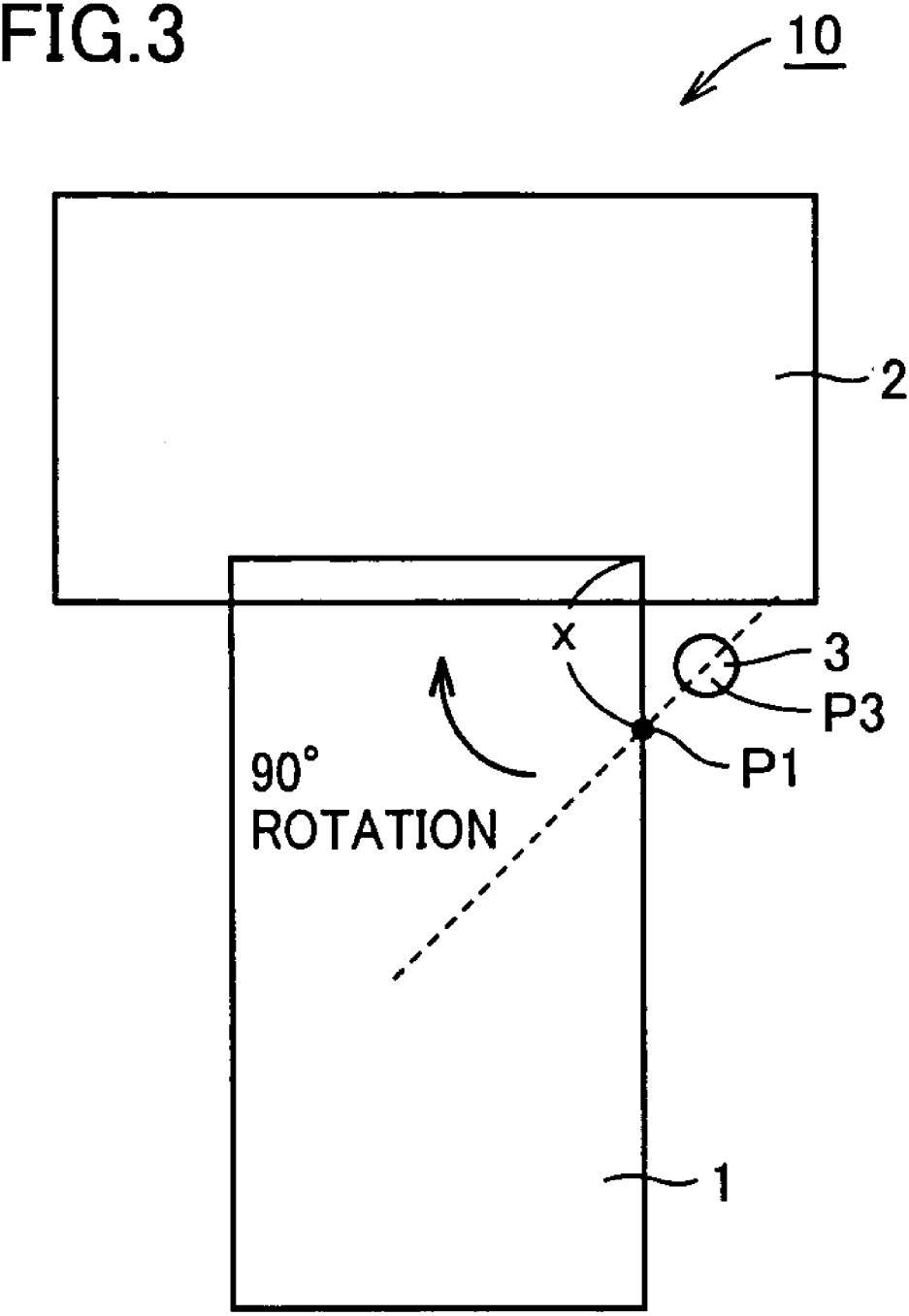
FIG. 3 is a front view of the portable information terminal of the first embodiment corresponding to an open state in which point P3 is taken as the rotation center of the rotation link mechanism.

Since the rotation center of rotation link mechanism 3 is arranged on a phantom line D-D set forth above in the present embodiment, the manipulation unit of first casing 1 is not concealed by second casing 2, and second casing 2 is arranged axially symmetric to center line C-C of first casing 1 in the open state, as shown in FIGS. 1A, 2 and 3.

The symmetric display in the lateral direction improves the visuality when the user holds first casing 1 in an open state. When the user is to play a game through portable information terminal 10, the operability of the game can be improved for the user when the display is axially symmetric to center line C-C of first casing 1.

The symmetric display in the lateral direction is also advantageous in that the weight distribution of portable information terminal 10 in an open state can be set symmetrical. This prevents portable information terminal 10 from tilting leftwards or rightwards in an open state. Further, the tilt of portable information terminal 10 can also be prevented when the user holds first casing 1 in an open state. Thus, the display unit can be viewed in stabilization even under an unstable condition such as in a moving vehicle or the like.

By holding first casing 1 in an open state, portable information terminal 10 can be held firmly without the display unit of second casing 2 being concealed by the finger of the holding hand.

Transition to an open state (landscape display) is facilitated since transition from one of a closed state and an open state to the other of the closed state and open state can be effected by one rotating operation.

Since the manipulation unit is located at the surface of first casing 1, the user can operate the manipulation unit of first casing 1 while holding first casing 1 with one hand. Since second casing 2 is linked to first casing 1 that is held by the hand of the user, the user can move second casing 2 to an open state by just slightly stretching his/her finger of the hand that is currently holding casing 1. The transition operation can be effected by one hand. Accordingly, the operation of opening portable information terminal 10, the keypad operation, and the closing operation can all be conducted with one hand.

In an unstable situation, the user can firmly hold first case 1 as a grip with the portable information terminal in an open state to watch television (television broadcast). In a stable situation, television can be enjoyed with the portable information terminal in a compact closed state.

Second Embodiment

On the basis of reference to FIGS. 4-11, a portable information terminal 10 according to a second embodiment of the present invention includes a first casing 1, a second casing 2, and a rotation link mechanism 3.

Figure 4:
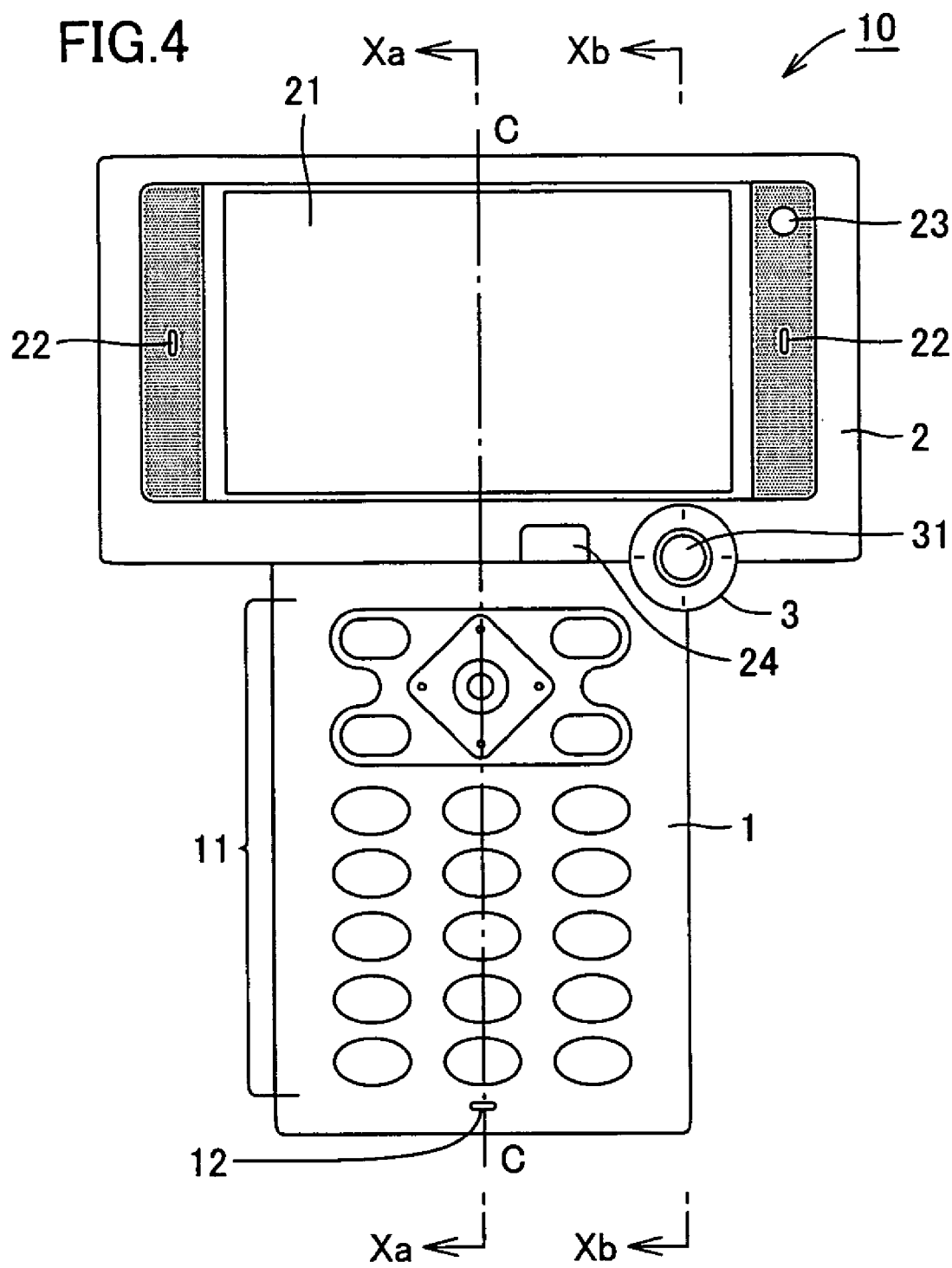
FIGS. 4 and 5 are a front view and a back side view, respectively, of a portable information terminal according to a second embodiment of the present invention corresponding to an open state.

Mainly referring to FIG. 4, a manipulation unit 11 and a microphone 12 for conversation are arranged on the surface of first casing 1. Manipulation unit 11 includes the ten-key, function keys directed to the shutter operation and the like, menu select keys directed to menu selection and the like, and a character switching key for switching characters. On the surface of second casing 2 are arranged a display unit 21 including, for example, a liquid crystal display, speakers 22 located at both sides of display unit 21, a camera 23, and a manipulation unit 24 functioning as, for example, a return key. Display unit 21 may be used as the finder for camera 23.

Figure 5:
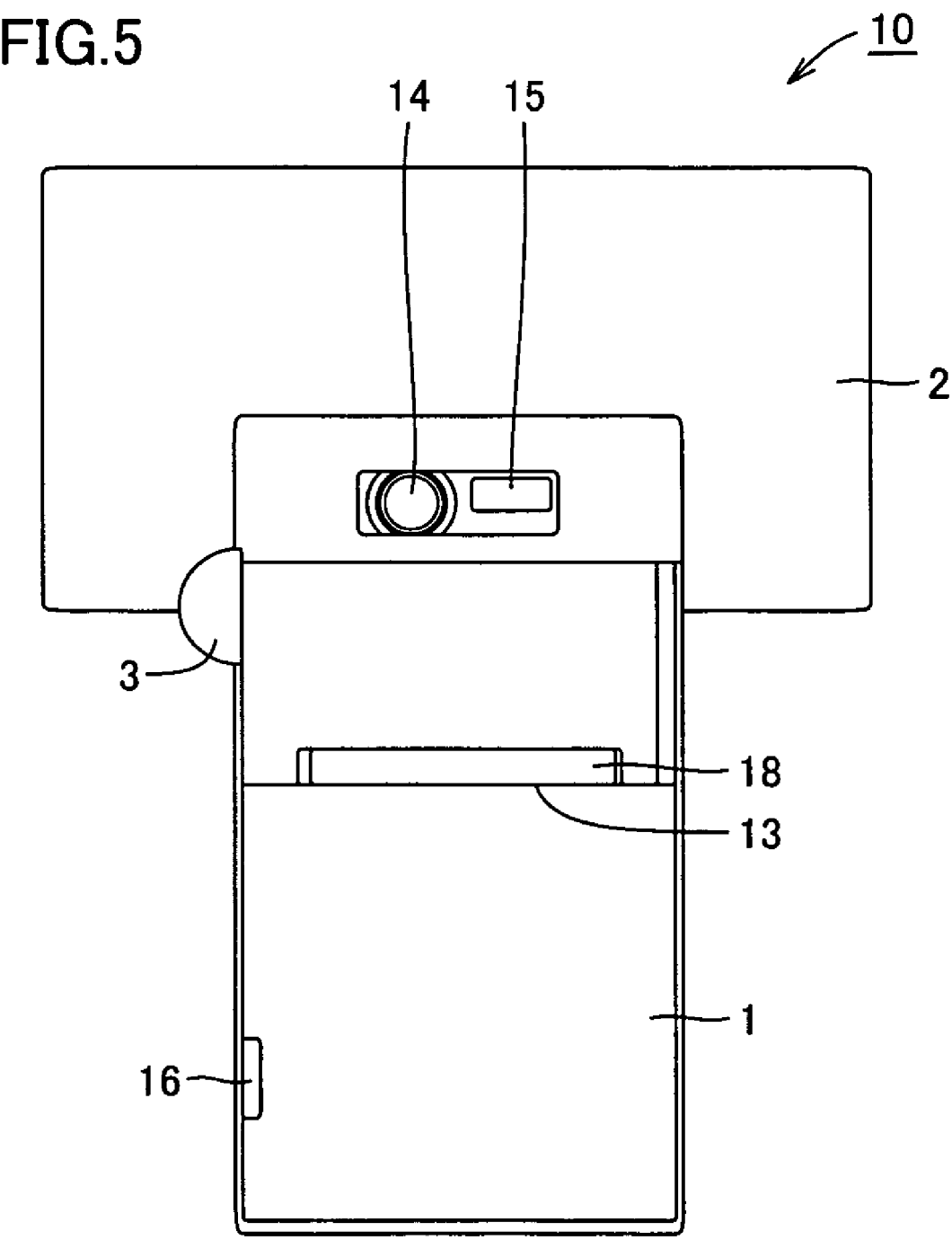
Figure 12:
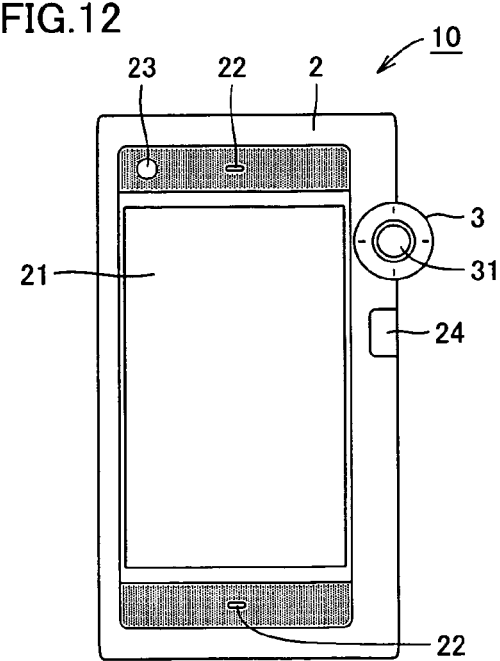
FIGS. 12, 13, 14 and 15 are a front view, a right side view, a top plan view, and a perspective view, respectively, of the portable information terminal of the second embodiment corresponding to a closed state.
Figure 13:
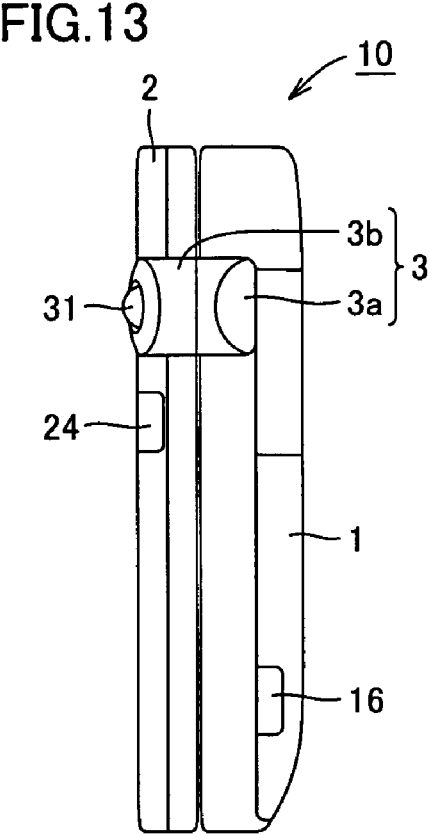
Figure 14:
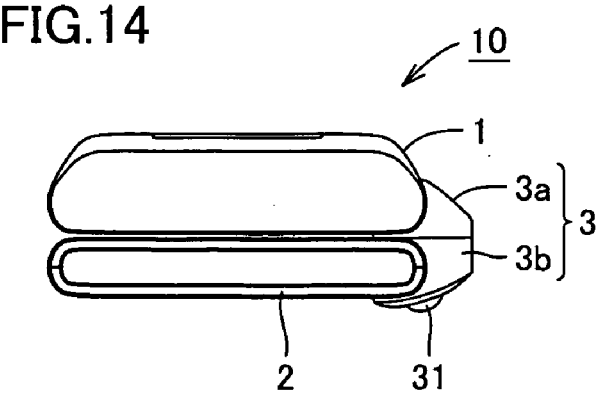
Figure 15:
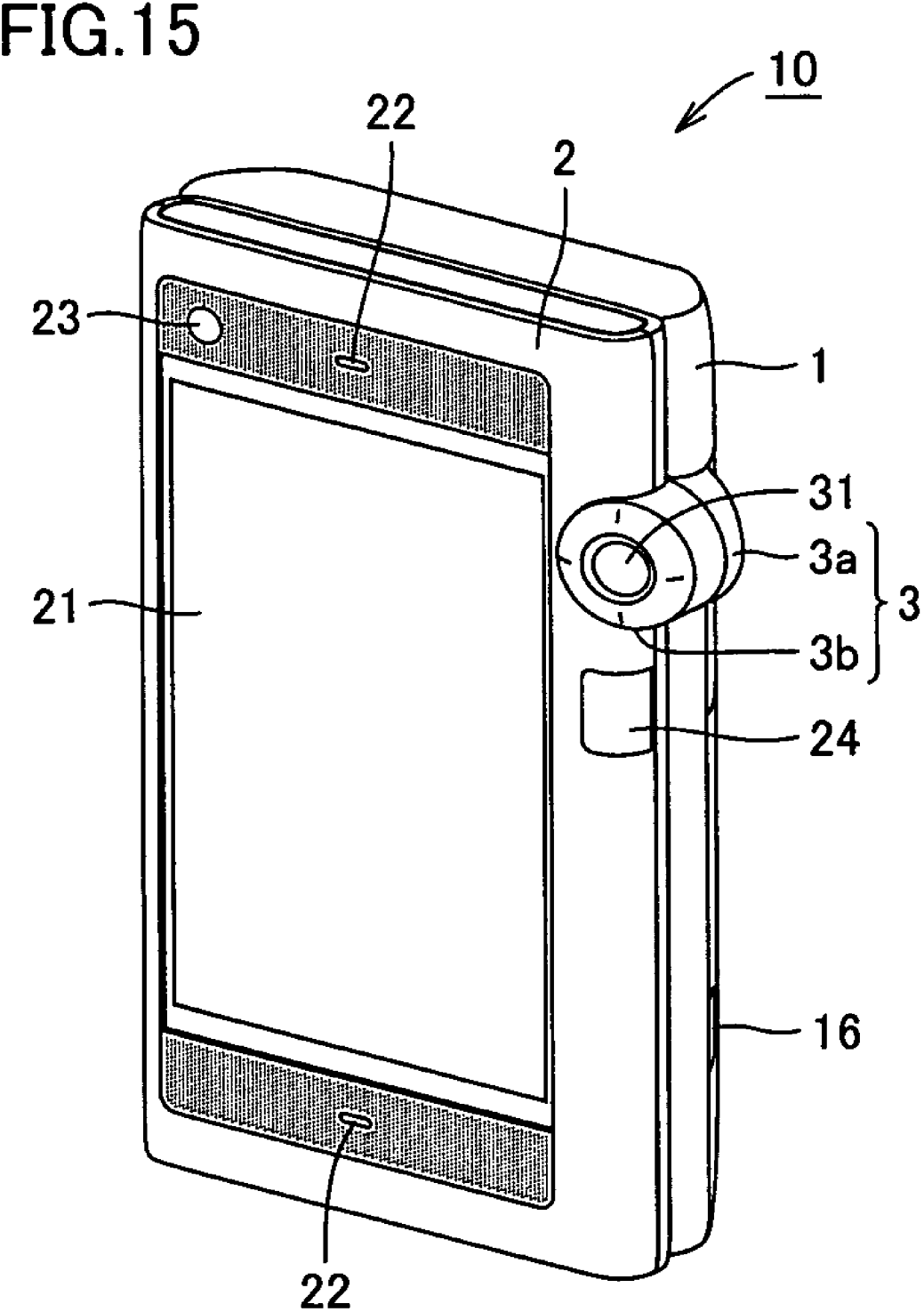

Mainly referring to FIG. 5, a stand 18, a groove 13 in which stand 18 can be stored, a camera 14, and a flash 15 are arranged at the back side of first casing 1. In this context, display unit 21 can be used as the finder for camera 14. For the purpose of displaying an image picked up by camera 14/23 (the image displayed at display unit 21) in a proper state regardless of whether display unit 21 takes a portrait orientation (closed state of FIG. 12) or a landscape orientation (the open state of FIG. 11), cameras 14 and 23 (image sensing element, for example, CCD) may be adapted to rotate according to the rotation of display unit 21.

Stand 18 can have its angle with respect to the back side of first casing 1 adjusted. By adjusting this angle, stand 18 can take a stored state in groove 13 or a protruding state angled with respect to the back side of first casing 1. A diversity system antenna (not shown), for example, is provided in stand 18.

Figure 6:
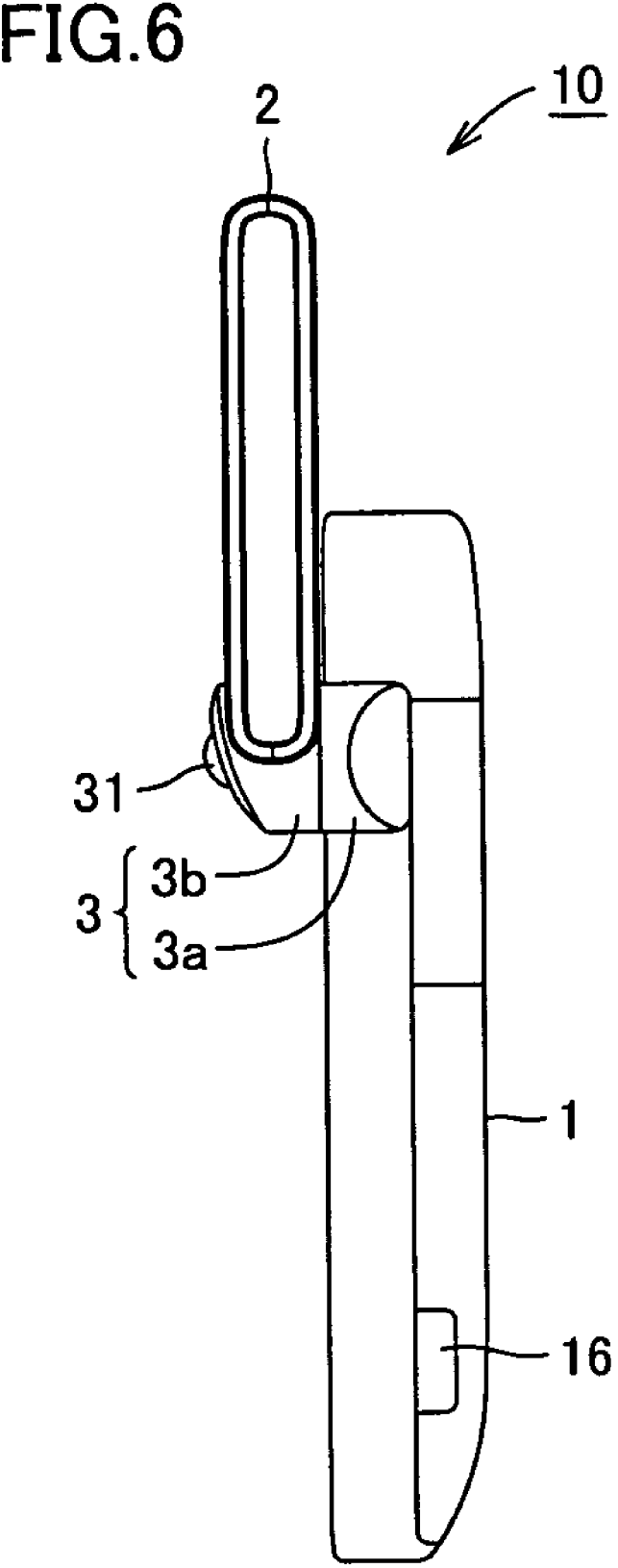
FIGS. 6 and 7 are a right side view and left side view, respectively, of the portable information terminal of the second embodiment corresponding to an open state.

Mainly referring to FIG. 6, a shutter button 16 is arranged at a side face (for example, the right side face) of first casing 1.

Figure 7:
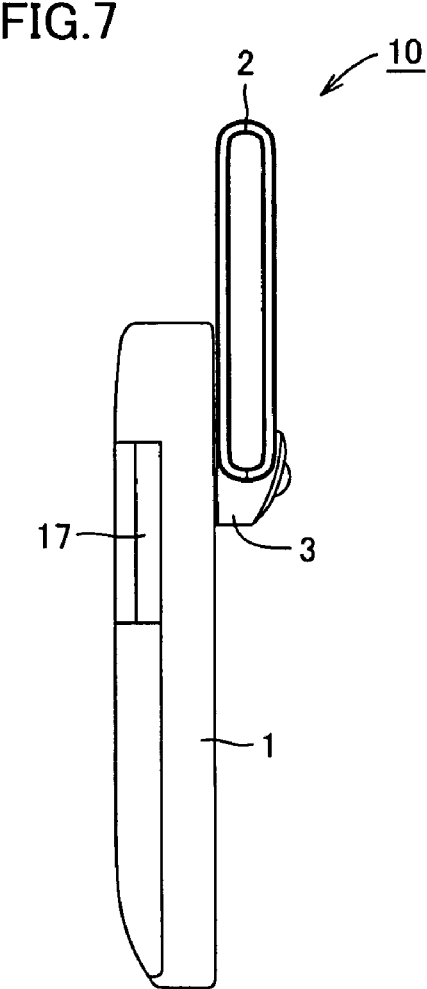
Figure 8:
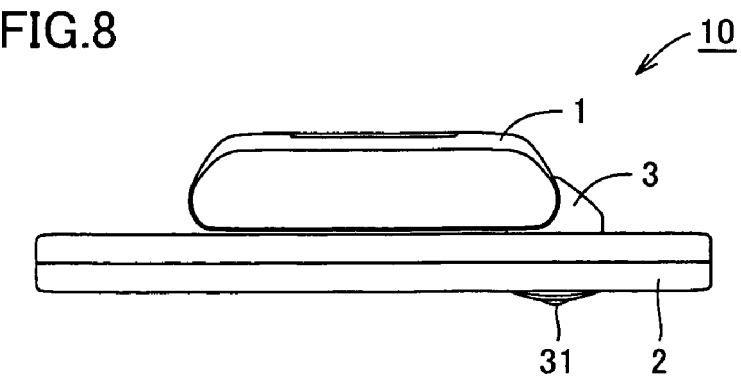
FIGS. 8 and 9 are a top plan view and bottom view, respectively, of the portable information terminal of the second embodiment corresponding to an open state.
Figure 9:
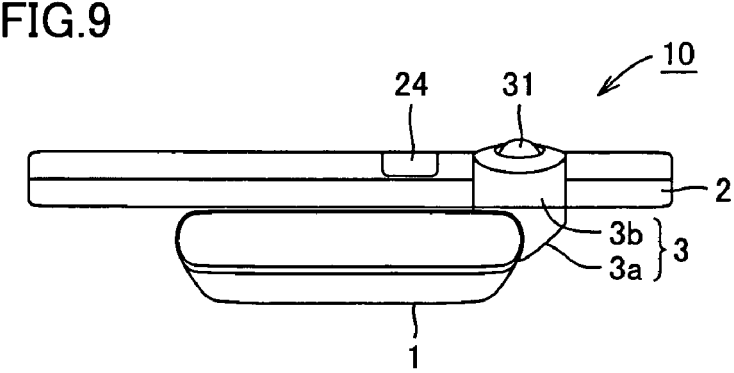

Mainly referring to FIG. 7, a slot 17 for inserting in an external recording medium such as a memory card into first casing 1 is arranged at a side face (for example, the left side face) of first casing 1. In the case where an image taken by camera 14 or 23 is to be stored in an external recording medium, a flag can be input to allow recognition of the state of the image stored (recorded) according to whether camera 14 or 23 is used in a portrait orientation or a landscape orientation (usage of the portrait orientation or landscape orientation is sensed by an acceleration sensor), whereby a screen in a proper state can be obtained at the time of reproduction. A broadcasted television program may be recorded in the external storage medium. An external storage medium in which a television program, music, or the like is recorded can be inserted into slot 17 to allow reproduction of the image and sound recorded in the inserted external storage medium through the mobile phone.

Referring mainly to FIG. 4, rotation link mechanism 3 functions to link first and second casings 1 and 2 such that second casing 2 rotates slidably with respect to first casing 1. Rotation link mechanism 3 is configured to allow transition from the state of either a closed state in which second casing 3 entirely covers the manipulation unit of first casing 1 or an open state in which second casing 2 is axially symmetric to center line C-C of first casing 1 and the manipulation unit of first casing 1 is not concealed by second casing 2 to the other of the closed state and open state by one rotating operation. For example, rotation link mechanism 3 takes point P1 of FIG. 1 described in the first embodiment as the rotation center.

Figure 10A:
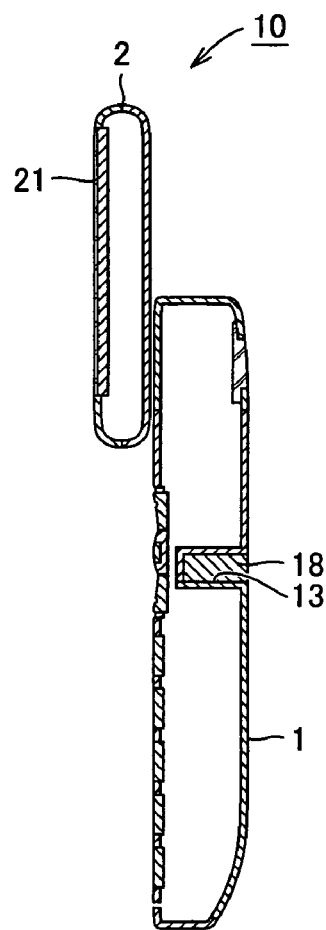
FIGS. 10A and 10B are schematic sectional views of the portable information terminal of the second embodiment taken along lines Xa-Xa and Xb-Xb, respectively, of FIG. 4.
Figure 10B:
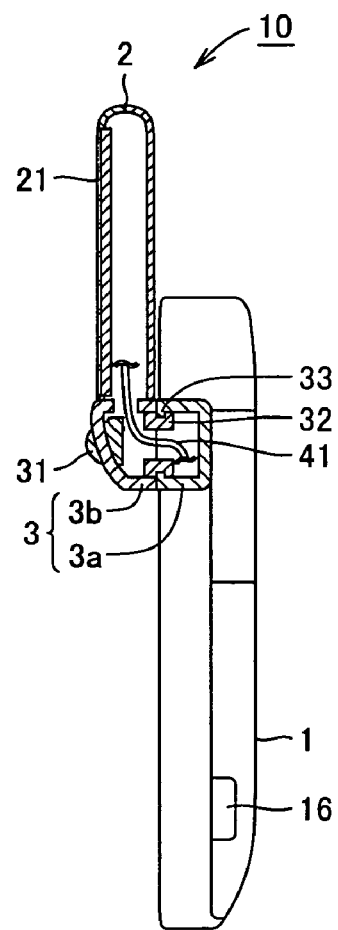
Figure 11:
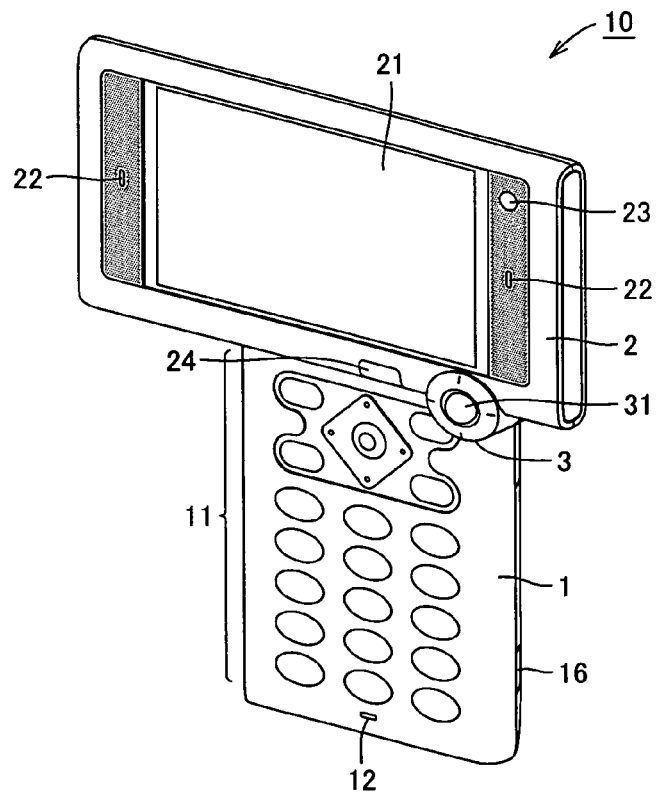
FIG. 11 is a perspective view of the portable information terminal of the second embodiment corresponding to an open state.

Mainly referring to FIGS. 10A and 10B, rotation link mechanism 3 includes a first rotation shaft unit 3a and a second rotation shaft unit 3b fitted together to allow rotation. First and second rotation shaft units 3a and 3b are both hollow. First rotation shaft unit 3a is secured to a side face of first casing 1. Second rotation shaft unit 3b is secured to a side face of second casing 2. The end face of first rotation shaft unit 3a and the end face of second rotation shaft unit 3b abut against each other, and a projection 33 protruding inward of first rotation shaft unit 3a is fitted into a recess 32 of second rotation shaft unit 3b. Thus, first and second rotation shaft units 3a and 3b are fitted together to allow rotation.

A wire bundle 41 formed of a plurality of wirings for electrical connection between the electrical devices of first and second casings 1 and 2 is passed through the inside of first and second rotation shaft units 3a and 3b. Accordingly, power can be supplied to display unit 21, speaker 22, camera 23, and the like from a battery or the like provided at first casing 1. Further, electrical signals can be transferred between the electrical devices of first and second casings 1 and 2.

Further, a manipulation unit 31 is arranged in first and second rotation shaft units 3a and 3b. Manipulation unit 31 is, for example, a cursor key. This cursor key can be used to move a pointer on the display screen in the vertical and horizontal directions, and also to scroll down in a window. The cursor key may be implemented to include the function as a determination key by being depressed for a duration.

Referring to FIGS. 12-15, second casing 2 entirely covers manipulation unit 11 of first casing 1 when portable information terminal 10 of the present embodiment attains a closed state. First and second casings 1 and 2 have substantially the same size and/or shape when viewed from the front. For example, first and second casings 1 and 2 take the shape of a rectangle, circle, ellipsis and the like. In the present embodiment, first and second casings 1 and 2 take a rectangular shape, and roughly overlap each other when viewed from the front in a closed state.

An opening/closing operation of the portable information terminal of the present embodiment will be described hereinafter with reference to FIG. 16.

Figure 16:
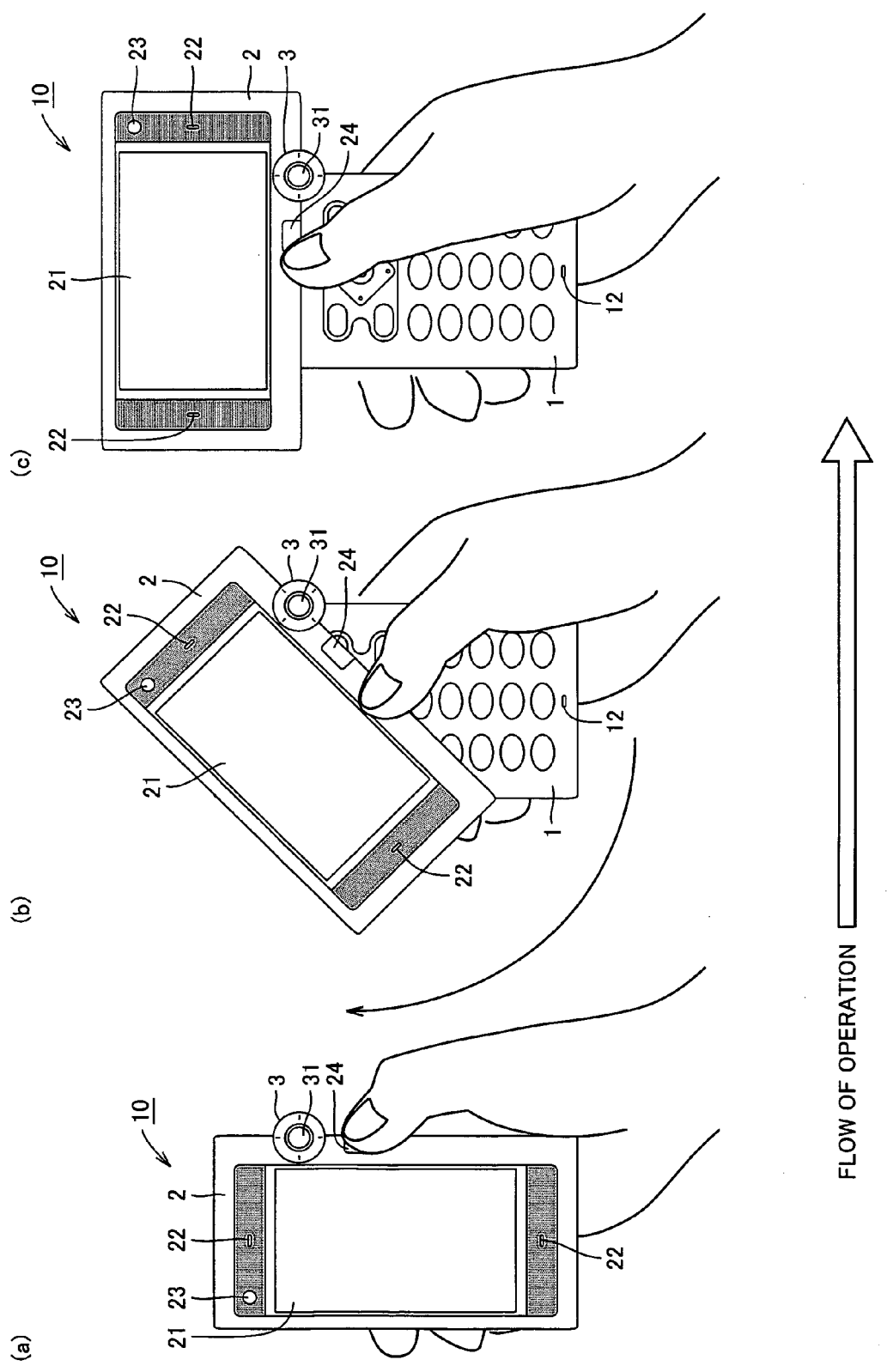
FIG. 16 is a front view of the portable information terminal of the second embodiment to describe an opening/closing operation.

In a closed state (FIG. 16 (a)), second casing 2 covers the entire region of the manipulation unit of first casing 1. By pushing up second casing 2 with the thumb of the hand holding first casing 1 from the closed position, second casing 2 rotates slidably clockwise in the drawing with respect to first casing 1, about the rotation center of rotation link mechanism 3. Accordingly, second casing 2 is gradually shifted relative to first casing 1 (FIG. 16 (b)). By rotating second casing 2 90° with respect to first casing 1, second casing 2 is axially symmetric to center line C-C of first casing 1, and the manipulation unit of first casing 1 is no longer concealed by second casing 2. Portable information terminal 10 takes an open state with a T shape in outline when viewed from the front (FIG. 16 (c)).

The operation from an open state to a closed state is conducted by rotating second casing 2 in a direction opposite to that set forth above.

The usage manner of the portable information terminal of the present embodiment will be described here. In the closed state corresponding to FIG. 16 (a), operations to send mail in a portrait orientation, to converse, and the like can be conducted. Each operation is selected via manipulation unit 24. In the case where the portable information terminal employs a touch panel, various operations can be conducted through the touch panel. In a closed state, the user can capture photographs in a manner similar to that of a digital camera. Specifically, camera 14 located at the back side of first casing 1 is pointed to the subject which can be confirmed together with the scene through display unit 21 currently located at the front. The user can snap a picture by depressing shutter button 16 located at the side face of first casing 1. Thus, a picture can be taken in a manner likewise to that of a digital camera.

The portable information terminal can be implemented such that, when taking a snap shot as set forth above (in the closed state of FIG. 16 (a)), the operation of the other shutter button (in this case, the shutter function through the function key of manipulation unit 11) is locked to be automatically set to a mode in which the operation of shutter button 16 is dominant. Accordingly, erroneous operation can be suppressed.

Figure 17:
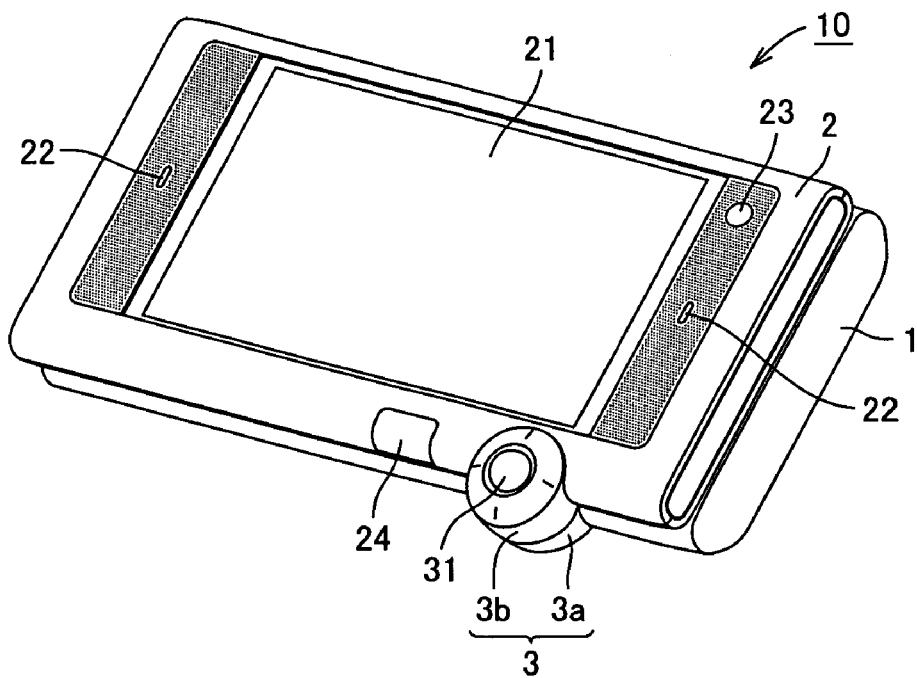
FIGS. 17 and 18 are a perspective view and a right side view, respectively, of the portable information terminal of the second embodiment to describe the usage manner in a closed state.
Figure 18:
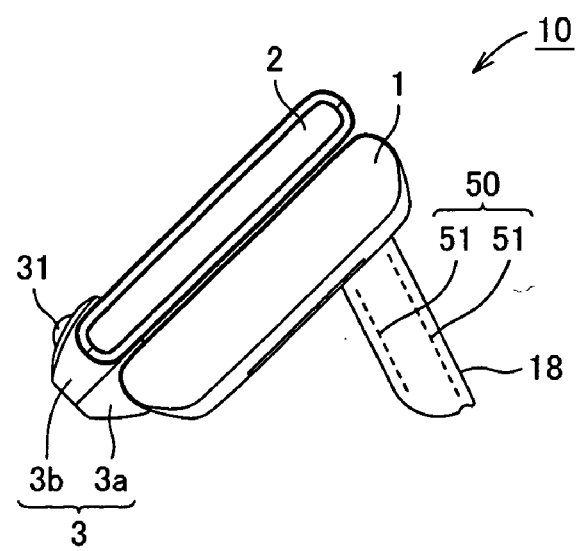

Further in a closed state, the user can propped up portable information terminal 10 on a desk or a flat surface with stand 18 pulled out, as shown in FIGS. 17 and 18, to watch television (television broadcast). Since an antenna 50 is arranged in stand 18, the most favorable position with respect to the reception sensitivity of antenna 50 can be obtained by altering the angle of stand 18 with respect to the back side of first casing 1 (the propped up angle). Since portable information terminal 10 can stand by itself by means of stand 18, a television program can be enjoyed without having to hold the portable information terminal with one's hand.

Portable information terminal 10 can be implemented to be automatically set (switched) to a mode in which the television broadcasting mode overrides other modes when portable information terminal 10 is set with stand 18 pulled out. Thus, the usability of the portable information terminal is improved.

Antenna 50 is preferably a diversity antenna. Diversity antenna 50 includes a plurality (for example, two) of antennas 51. This is advantageous in that the signal of antenna 51 that is superior in wave can be used in priority, and that the received signal can be synthesized to remove noise, allowing higher reception stability.

Figure 19:
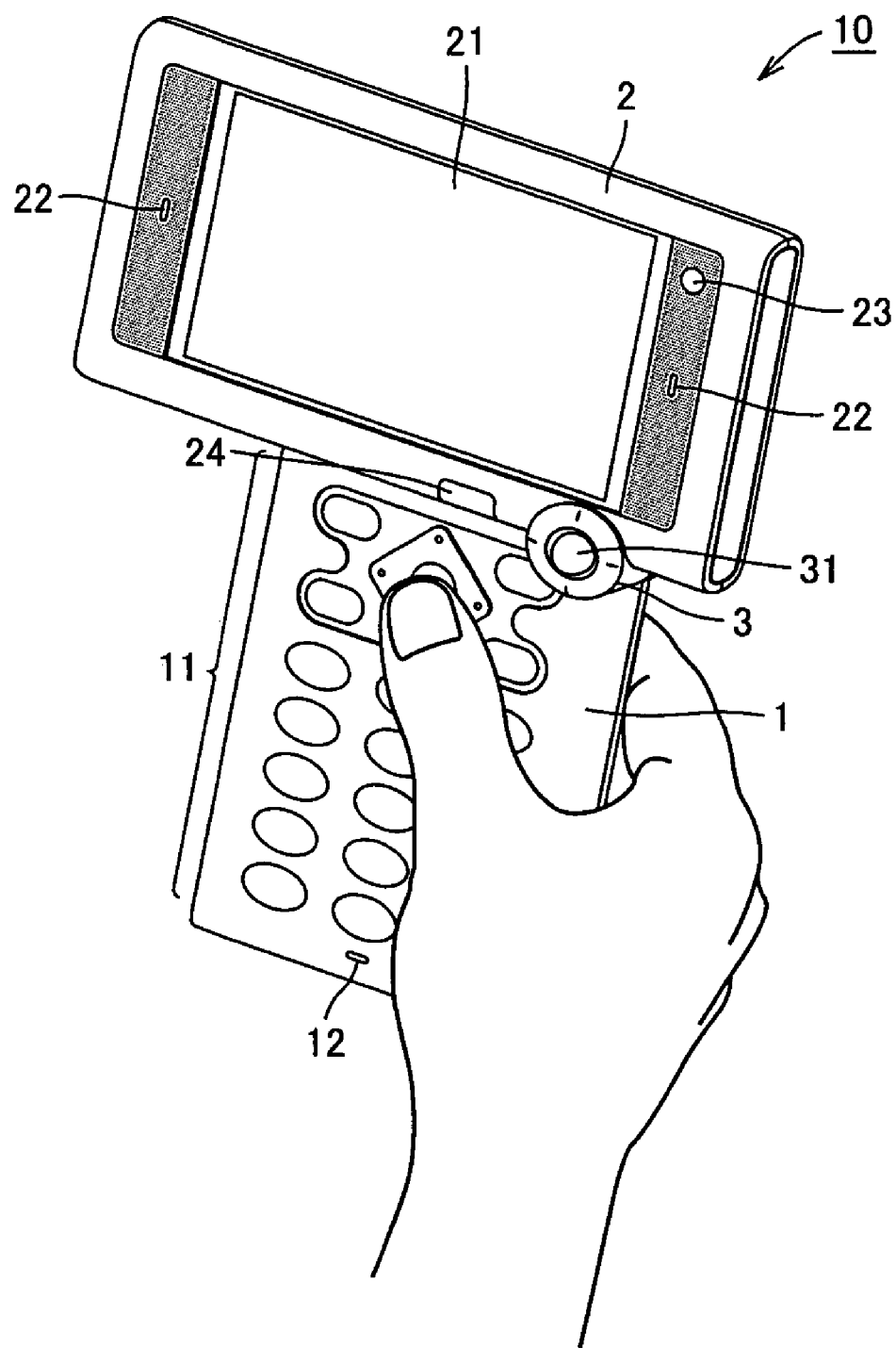
FIG. 19 is a perspective view of the portable information terminal of the second embodiment to describe the usage manner in an open state.

In an open position, the user can watch television holding first casing 1 as a grip, as shown in FIG. 19. Further, the user can send a mail or converse by operating respective keys of manipulation unit 11 using his/her thumb while holding first casing 1.

Figure 20:
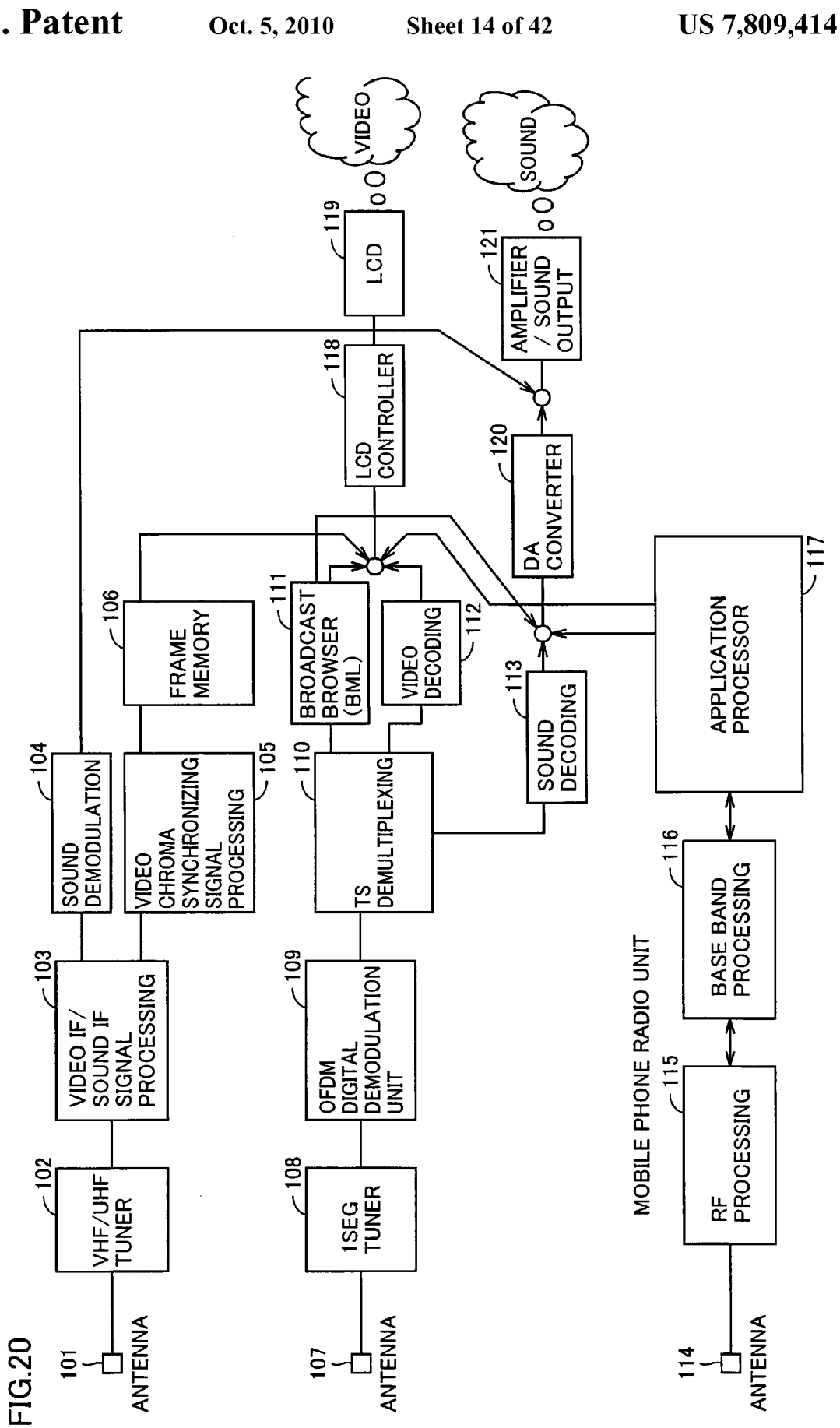
FIG. 20 is a circuit block diagram representing an example of electric circuitry of the portable information terminal of the second embodiment.
Figure 21:
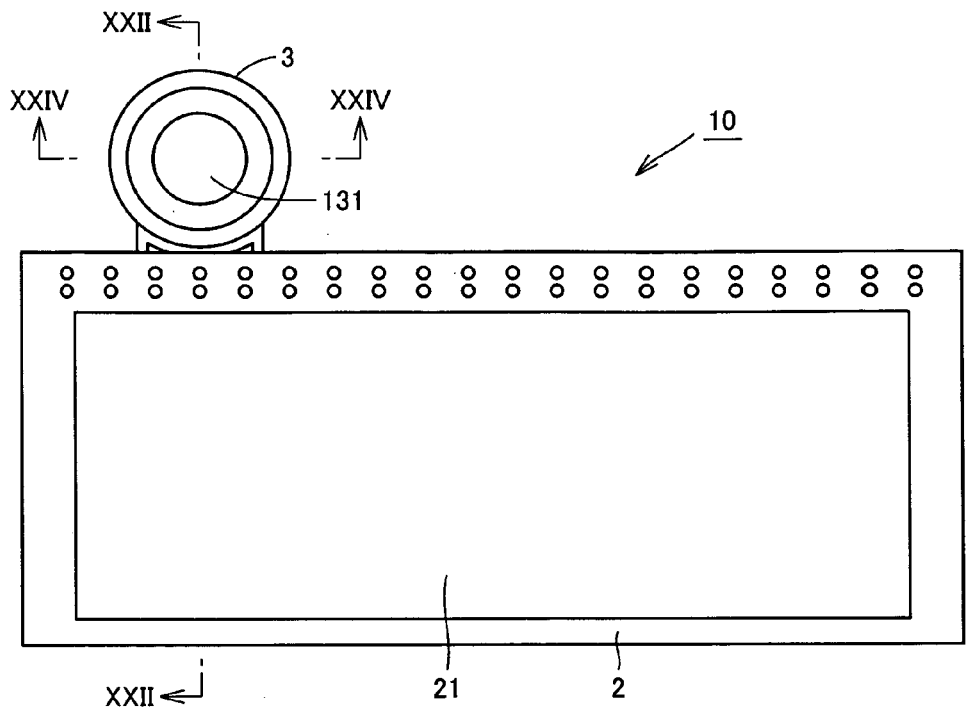
FIG. 21 is a front view of a portable information terminal in a closed state, employing a track ball.

The electric circuitry of the portable information terminal of the present embodiment will be described here with reference to FIG. 20 showing an example thereof. Referring to FIG. 20, the electric circuitry of the present embodiment includes a terrestrial analog broadcast reception unit, a terrestrial digital broadcast reception unit, and a mobile phone radio unit.

At the terrestrial analog broadcast reception unit, signals received through antenna 101 are put through processing at a VHF/UHF tuner circuit 102 and a video IF (Interface)/sound IF signal processing circuit 103. Then, sound signals are processed at a sound demodulation circuit 104 to be output as sound by an amplifier/sound output circuit 121. Video signals are processed at a video chroma synchronizing signal processing circuit 105 and a frame memory circuit 106 to be provided to an LCD (Liquid Crystal Display) controller circuit 118.

At the terrestrial digital broadcast reception unit, signals received through antenna 107 are processed at a 1 SEG (segment) tuner circuit 108, an OFDM (Orthogonal Frequency-Division Multiplexing) digital demodulation circuit 109, and a TS (Transport Streams) demultiplex circuit 110. Video signals are processed in parallel at a broadcast browser circuit 111 and a video decode circuit 112 to be provided to an LCD controller circuit 118. Sound signals are processed in parallel at broadcast browser circuit 111 and a sound decode circuit 113 to be provided to a DA (Digital/Analog) converter circuit 120.

At the mobile phone radio unit, signals received through antenna 114 are processed at an RF (Radio Frequency) processing circuit 115 and a base band processing circuit 116, and pass through an application processor circuit 117 such that video signals are provided to LCD controller circuit 118 and sound signals are provided to DA converter circuit 120.

The video signals provided to LCD controller circuit 118 are output as video through an LCD circuit 119. The sound signals provided to DA converter circuit 120 are output as sound by an amplifier/sound output circuit 121.

In the foregoing, rotation link mechanism 3 is described with cursor key 31 as the manipulation unit. Alternatively, the manipulation unit may be a track ball 131. A configuration employing a track ball will be described with reference to FIGS. 21-25.

Figure 25:
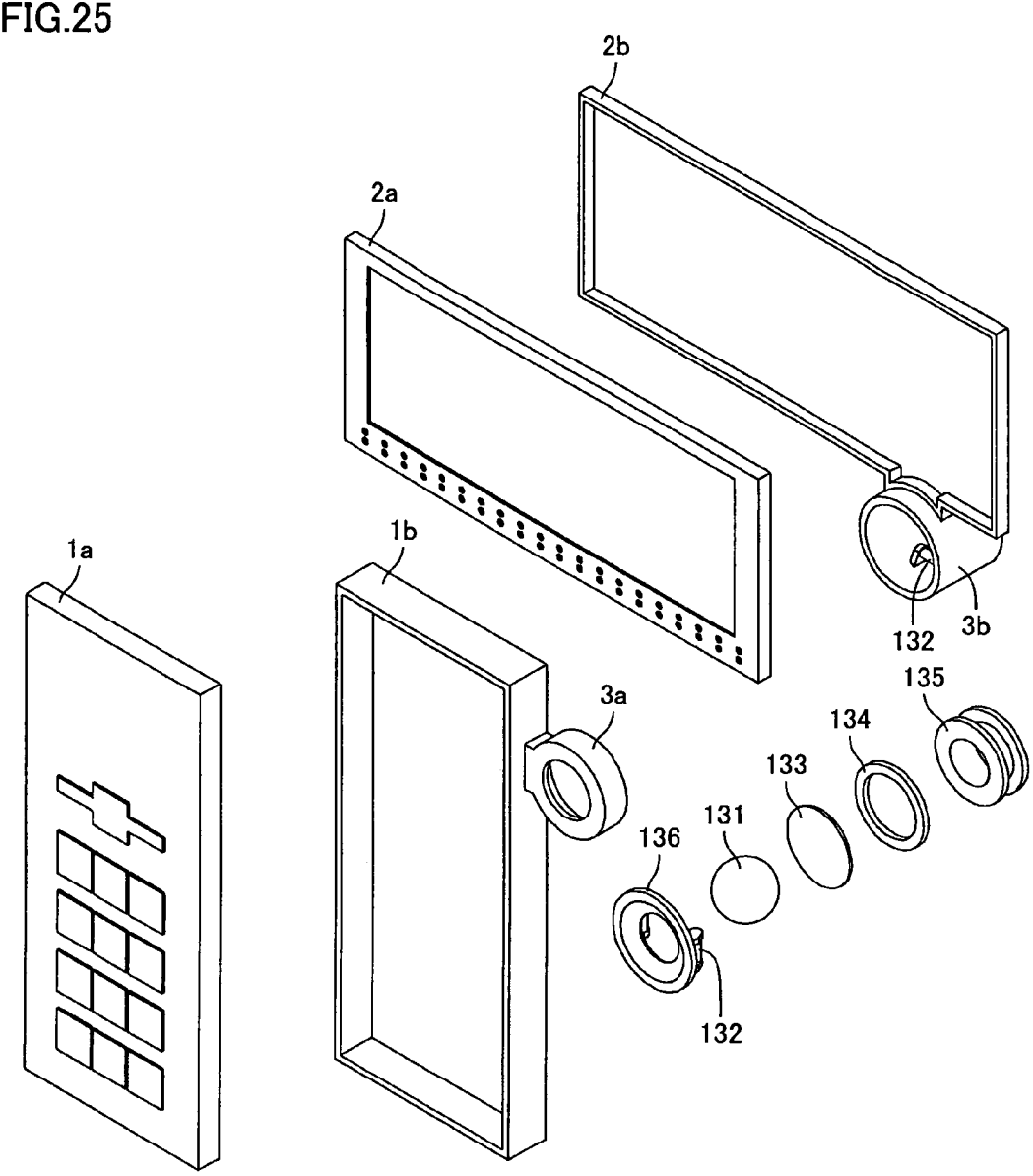
FIG. 25 is a broken perspective view of the portable information terminal in a closed state, employing a track ball.
Figure 26:
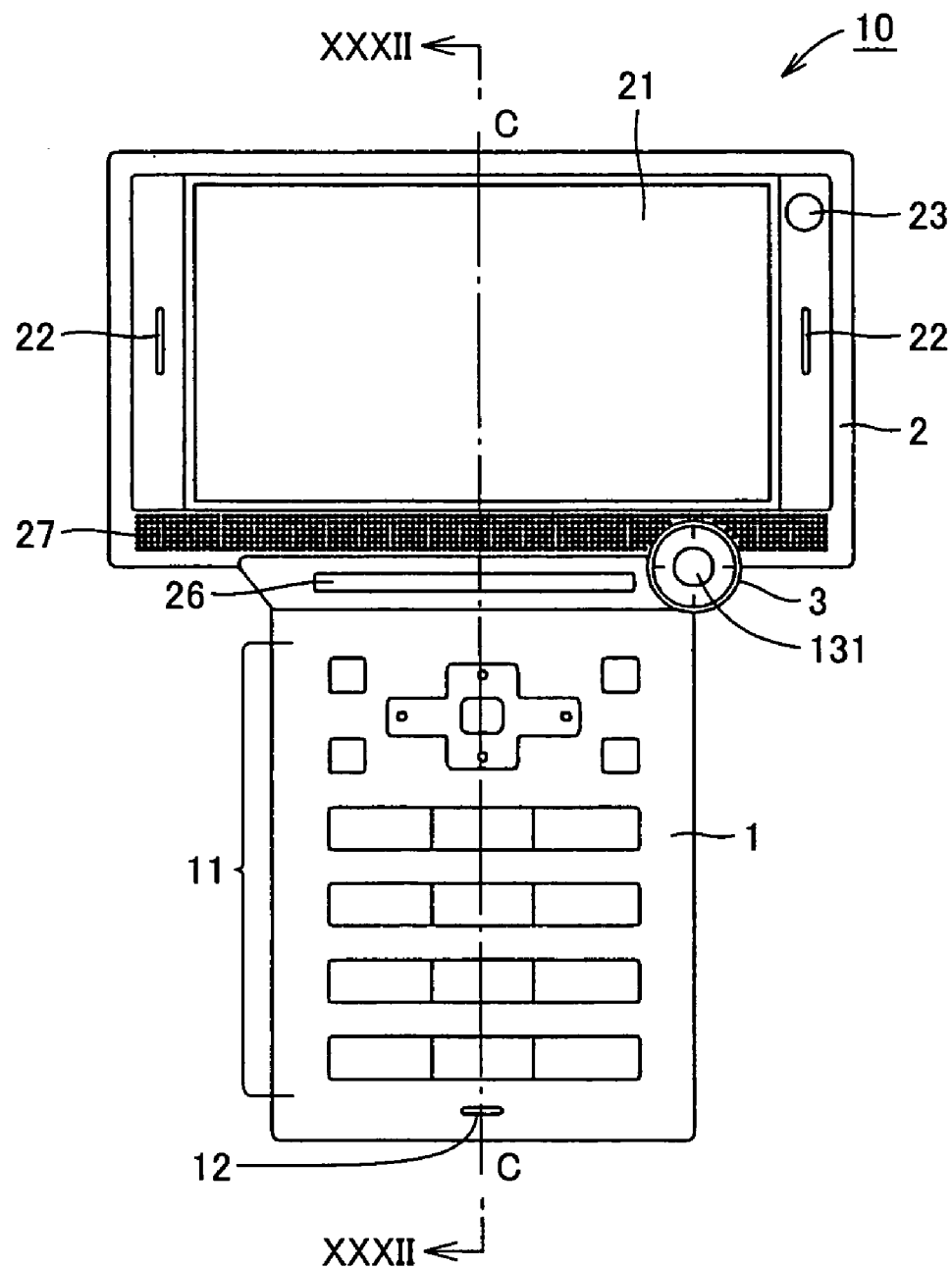
FIGS. 26, 27, 28, 29, 30 and 31 are a front view, a back side view, a right side view, a left side view, a top plan view, and a bottom view, respectively, of a portable information terminal in an open state according to a third embodiment of the present invention.
Figure 27:
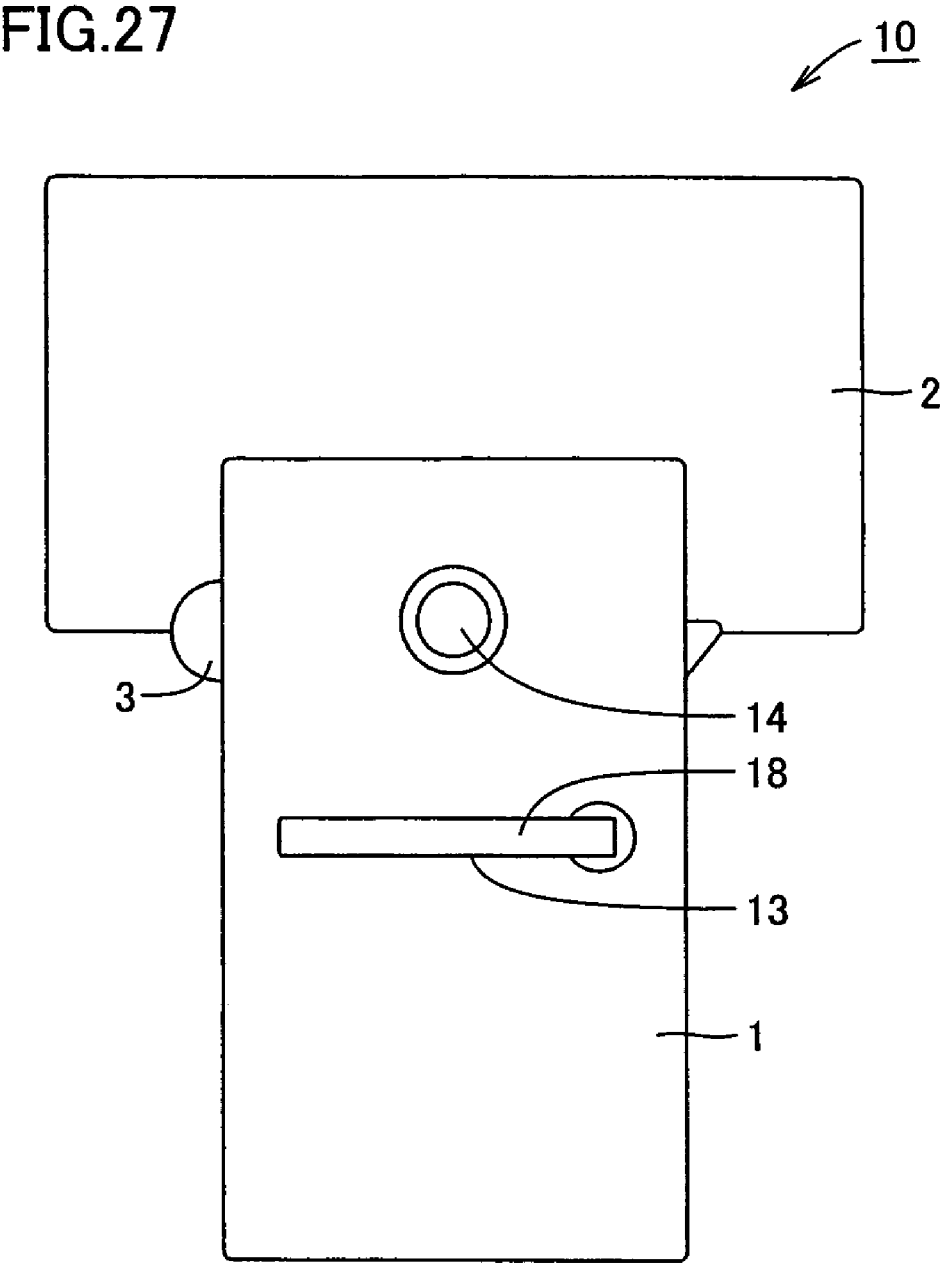
Figure 28:
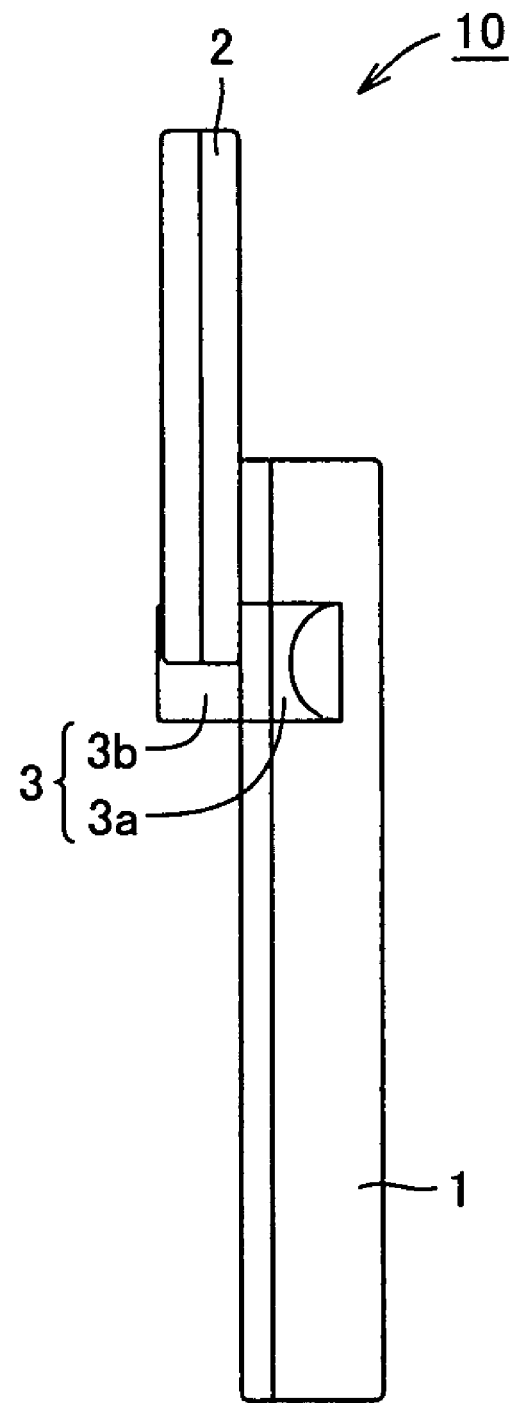
Figure 29:
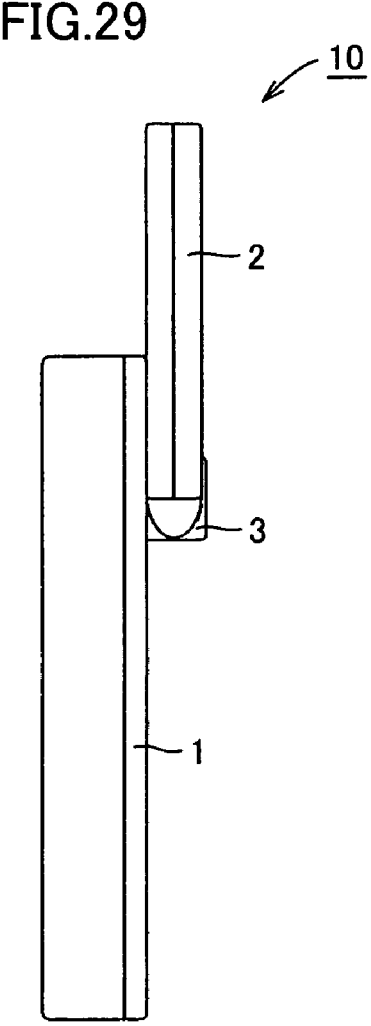
Figure 30:
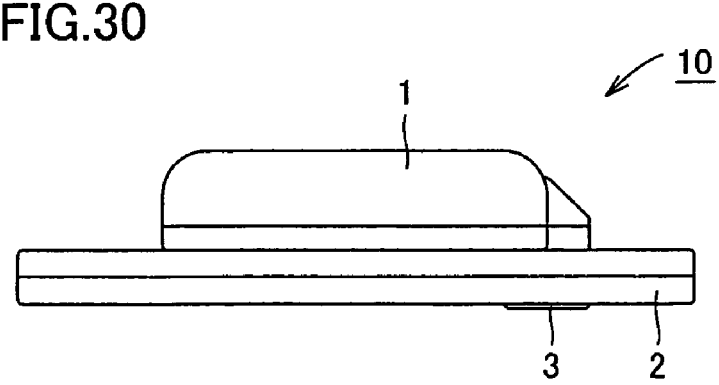
Figure 31:
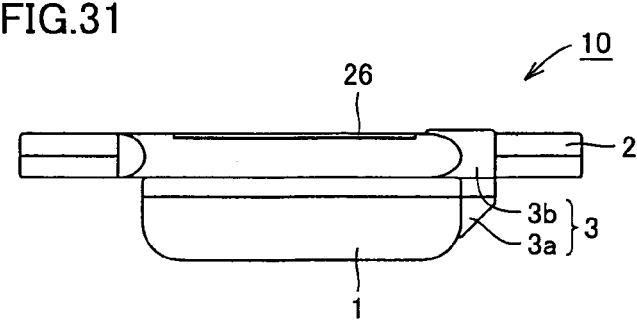
Figure 32:
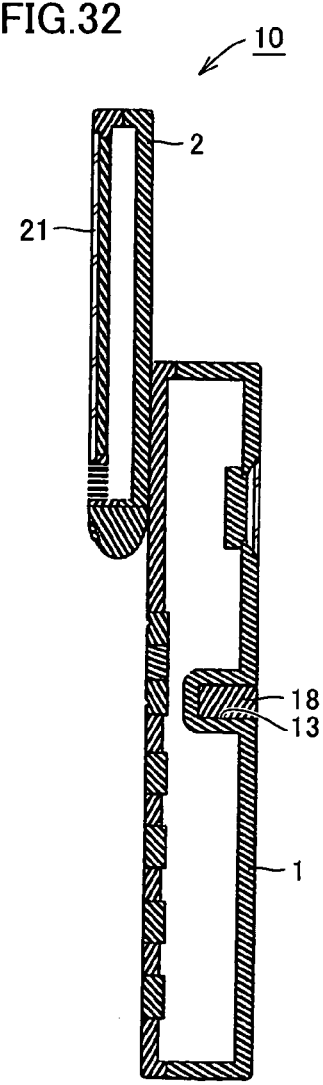
FIG. 32 is a schematic sectional view of the portable information terminal of the third embodiment taken along line XXXII-XXII of FIG. 26.
Figure 33:
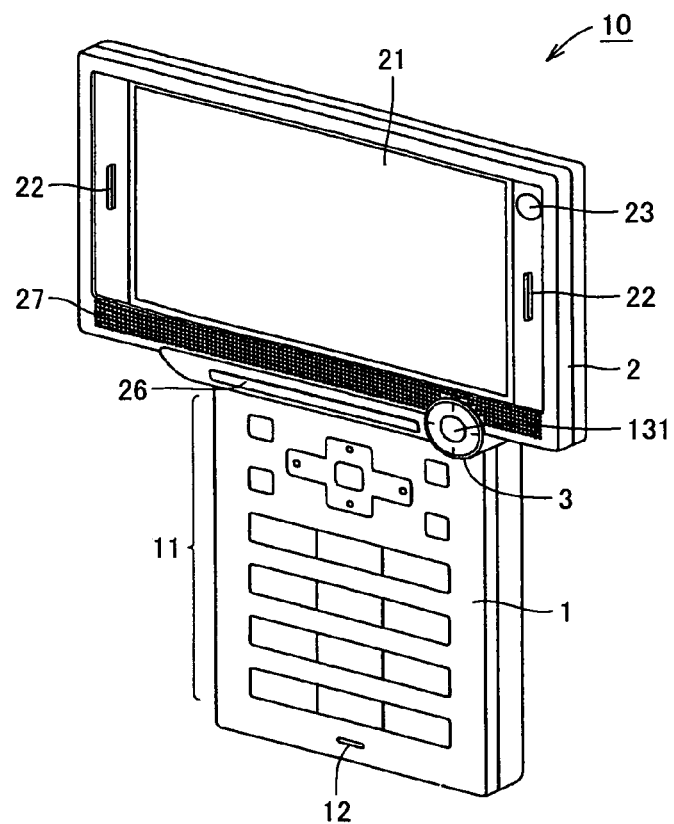
FIG. 33 is a perspective view of the portable information terminal in an open state of the third embodiment.

Mainly referring to FIG. 25, the device of the track ball unit includes track ball 131, a ball shaft 132, a substrate 133 for rotation detection, a rotation hinge movable plate 134, a rotation hinge secure plate 135, and a track ball cover 136.

Track ball 131 is a sphere, and supported by ball shaft 132 in the vertical direction. Ball shaft 132 in contact with the upper side of track ball 131 (the second casing side) is fixed to track ball cover 136. Ball shaft 132 in contact with the lower side of track ball 131 (the first casing side) is fixed to second rotation shaft unit 3b. Substrate 133 for rotation detection is arranged at the lower side of track ball 131 (first casing side).

Figure 22:
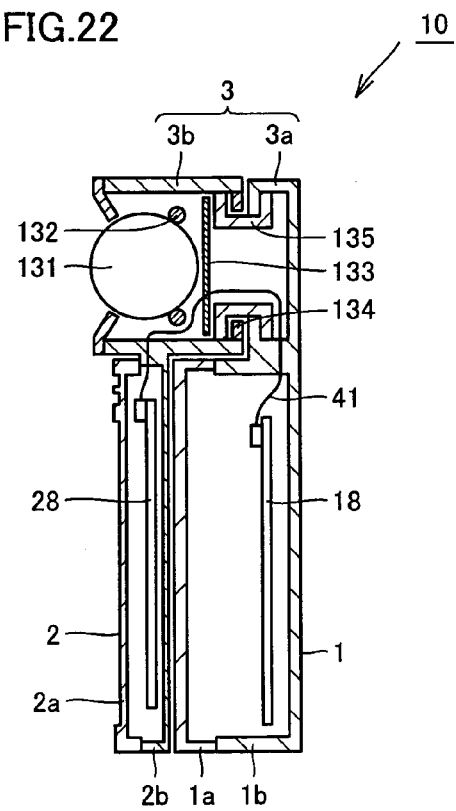
FIG. 22 is a schematic sectional view of the portable information terminal in a closed state, employing a track ball, taken along line XXII-XXII of FIG. 21.
Figure 23:
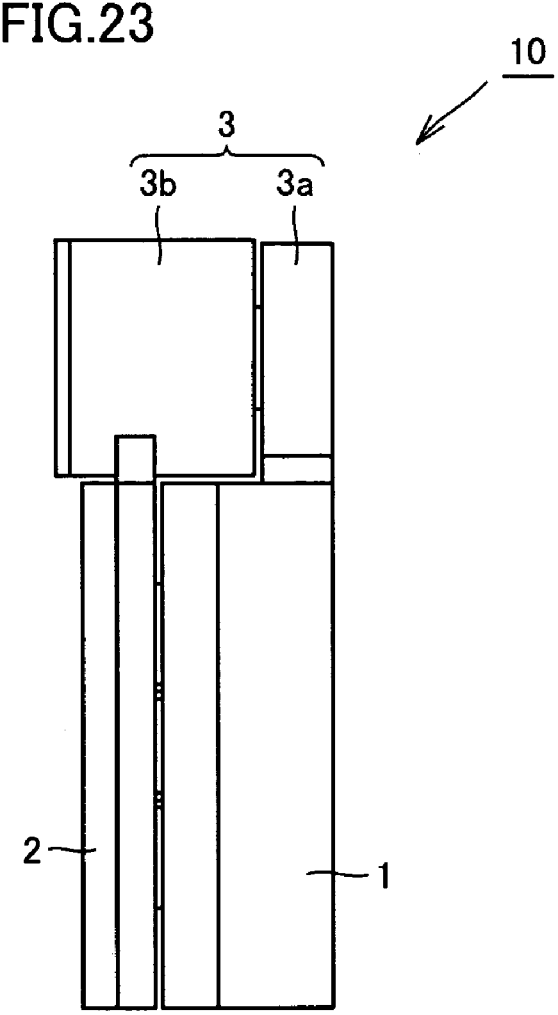
FIG. 23 is a right side view of the portable information terminal in a closed state, employing a track ball.
Figure 24:
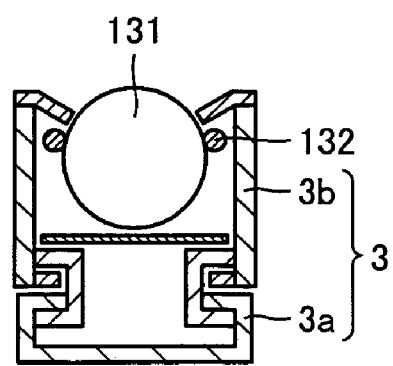
FIG. 24 is a schematic sectional view of the portable information terminal in a closed state, employing a track ball, taken along line XXIV-XXIV of FIG. 21.

Referring mainly to FIG. 22, rotation hinge movable plate 134 is fixed to the inner circumferential face of second rotation shaft unit 3b. Rotation hinge secure plate 135 is fixed to the inner circumferential face of rotation shaft unit 3a. Rotation hinge movable plate 134 is fitted into a groove provided at the outer circumferential face of rotation hinge secure plate 135. Accordingly, second rotation shaft unit 3b is supported rotatably to first rotation shaft unit 3a.

Referring to FIGS. 21-25, first rotation shaft unit 3a is formed integral with a key bottom cabinet 1b. Second rotation shaft unit 3b is formed integral with a liquid crystal bottom cabinet 2b. First casing 1 includes a key upper cabinet 1b and key bottom cabinet 1b. Second casing 2 includes a liquid crystal upper cabinet 2a and liquid crystal bottom cabinet 2b.

An operation similar to that using the cursor key can be conducted by using track ball 131.

The second embodiment can provide functional effects similar to those of the first embodiment.

Speakers 22 located at either side of display unit 21 may be switched as set forth below according to the state of usage. Specifically, when the user is watching television in an open state or closed state, sound is emitted from the right side and left side independent of each other corresponding to the stereo sound. When the user is conversing through the phone in an open state, speakers 23 at either side may emit sound in monaural sound. When the user is conversing through the phone in a closed state, one of speakers 22 may emit the voice of the talking party whereas the other speaker 22 may function as a microphone. Thus, the other speaker 22 may be configured as both a speaker and a microphone through one member. Alternatively, a member functioning as a speaker and another member functioning as a microphone may be provided separately.

Wire 41 is arranged intentionally with some slack, allowing second casing 2 to be rotated smoothly 360° relative to first casing 1.

Wire bundle 41 may be an element that has elasticity such as a coil spring. Wire bundle 41 can be stretched appropriately by the elasticity, allowing second casing 2 to be rotated smoothly 360° relative to first casing 1. Wire bundle 41 can be dispensed with by establishing connection between the electronic devices of first casing 1 and second casing 2 in a wireless manner. In this case, a power supply may be provided at one of the casings such that power is supplied from one casing to the other casing by electromagnetic induction.

A camera (not shown) can be disposed inside first rotation shaft unit 3a and second rotation shaft 3b in addition to manipulation unit 31. This camera may be located at the back side of first casing 1, or at the surface side of second casing 2. Further, the number of cameras disposed within first and second rotation shaft units 3a and 3b is not limited to one, and two or more cameras may be installed. In the case where two cameras are incorporated, one camera can be located at the back side of first casing 1 (for snapping a photo of another party), and the other camera can be located at the surface side of second casing 2 (for self-portrait).

The shutter operation of one and the other of cameras can be conducted in a manner of altering the operation time interval and number of times of the function key of manipulation unit 11. Further, the shutter operation of one camera may be conducted by operating a function key of manipulation unit 11, whereas the shutter operation of the other camera may be conducted by incorporating a shutter function at manipulation unit 24.

Flash 15 may be a light emitting diode, or a strobe light employing xenon.

The dimension ratio of the longer side to the shorter side of display unit 21 may be 16:9, or 4:3. Display unit 21 may be a touch panel through which the general television operation (channel change, volume, screen contrast, screen switching, screen audio switching, and the like) and/or telephone operation can be conducted. The surface can be covered with tempered glass such as sapphire glass. Display unit 21 may be adapted to provide multi-screen display (split screen: for example, two screens, three screens, four screens, and the like) in addition to one-screen display. In the case of multi-screen display, a television screen, an electronic program guide (EPG) screen, a game screen, a mail screen, and the like can be combined appropriately with one display unit 21. Accordingly, the user can read, generate, and return mail while watching television, reserve a television program, play a game, or the like. The user can perform the operation of simultaneous processing of several information at the same time.

Portable information terminal 10 may have a recording function of a television program. Additionally, a non-contact electronic settlement function and/or a personal identifier function may be incorporated. Particularly in the case where a non-contact electronic settlement function is adapted, portable information terminal 10 of the present embodiment is particularly suitable for such usage since it is preferable to allow the user to confirm various sophisticated information required for electronic settlement (fare adjustment, ticket information, fee, bar code, and the like) with portable information terminal 10 in a closed state. In the case where a non-contact electronic settlement function and/or a personal identifier function is to be incorporated, portable information terminal 10 is preferably configured to allow loading of an IC (Integrated Circuit) card such as an SIM (Subscriber Identity Module) card.

The width of portable information terminal 10 (the dimension in the direction of each unitary side of first and second casings 1 and 2) is preferably not more than 50 mm±10 mm. Since portable information terminal 10 takes a T shape in an open state, the center of gravity of portable information terminal 10 will be located at a relatively upper position. Portable information terminal 10 must be held firmly since the upper portion is apt to readily sway leftwards or rightwards. The dimension set forth above allows the user even with a relatively small hand to hold portable information terminal 10 firmly by gripping first casing 1 in an open state.

Third Embodiment

Portable information terminal 10 of the third embodiment differs in configuration from portable information terminal 10 of the first embodiment in that a glide pad 26 and a speaker 73 are additionally incorporated, as will be described hereinafter with reference to FIGS. 26-37.

Glide pad 26 and speaker 27 are arranged at the surface of second casing 2, at one of the longer sides of display unit 21 and where rotation link mechanism 3 is provided. Glide pad 26 is one type of a pointing device, also called a touch pad, track pad, flat point, and the like. Glide pad 26 incorporates a multi-layer printed board where rectangular electrodes are arranged in a crossing manner. A slight amount of electricity is accumulated between the electrodes. When a conductor that passes electricity such as a finger touches the surface of glide pad 26, the amount of electricity (capacitance) stored changes in response to change in the electric field between the electrodes. The coordinates of the finger can be read out through the amount of change in electricity.

The remaining structure is substantially similar to that of the first embodiment set forth above. The same reference characters are allotted to the same structural elements, and description thereof will not be repeated.

The opening and closing operation of the portable information terminal of the present embodiment will be described here.

Figure 38:
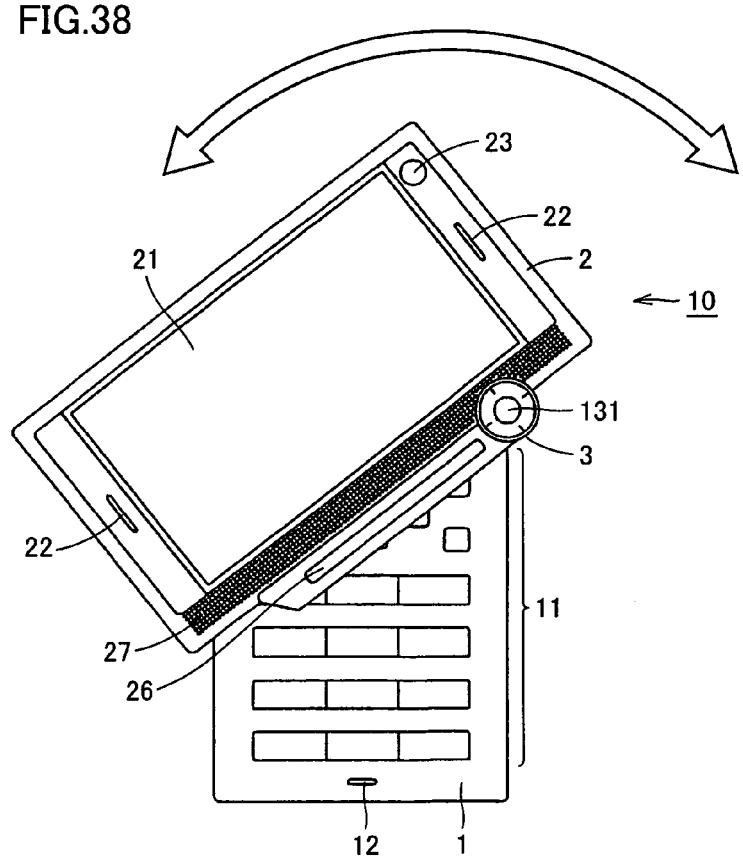
FIG. 38 is a front view of the portable information terminal of the third embodiment to describe an opening and closing operation.

Referring to FIG. 38 corresponding to a closed state, second casing 2 entirely covers first casing 1, likewise the first and second embodiments. By pushing up second casing 2 with the thumb of the hand holding first casing 1 from the closed state, second casing 2 rotates slidably clockwise in the drawing about the rotation center of rotation link mechanism 3 with respect to first casing 1. Accordingly, second casing 2 is gradually shifted relative to first casing 1. By rotating second casing 2 90° with respect to first casing 1, the manipulation unit is exposed and not concealed by second casing 2. Also, second casing 2 is axially symmetric to center line C-C of first casing 1. Portable information terminal 10 takes an open state of a T shape in outline.

The operation from an open state to a closed state is effected by rotating second casing 2 in a direction opposite to that set forth above.

The manner of usage of the portable information terminal of the present embodiment will be described here.

Figure 34:
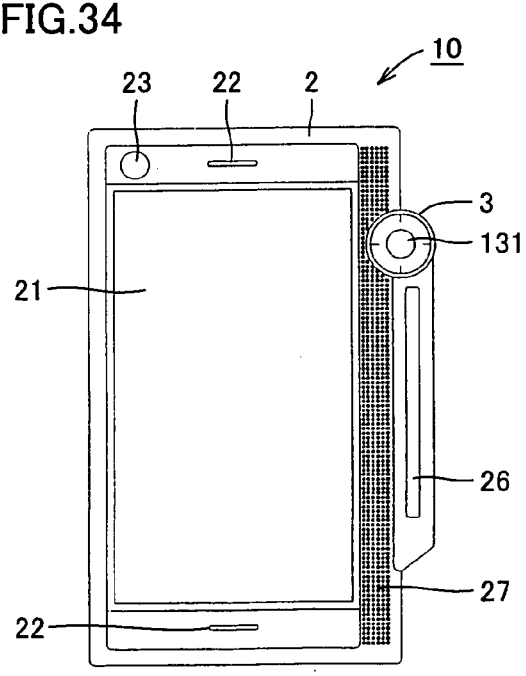
FIGS. 34, 35, 36, and 37 are a front view, a right side view, a top plan view, and a perspective view, respectively, of the portable information terminal in a closed state of the third embodiment.
Figure 35:
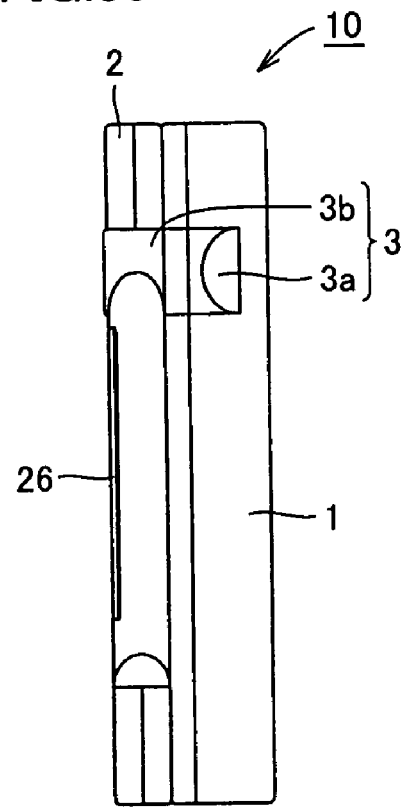
Figure 36:
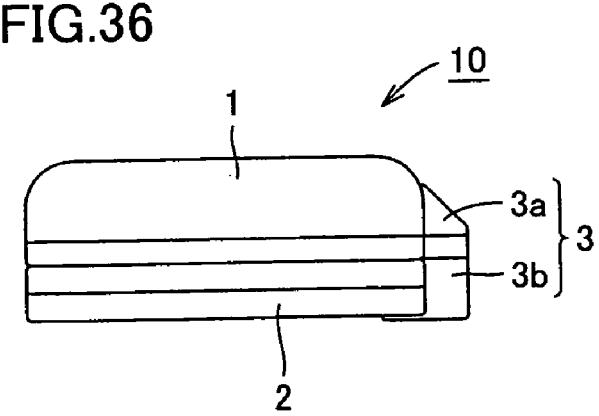
Figure 37:
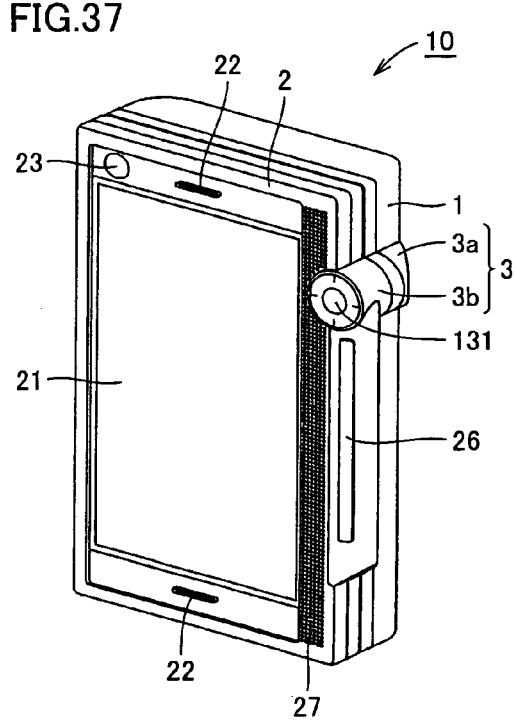

In a closed state corresponding to FIG. 34, the operation for mail and conversation, for example, can be conducted in a portrait orientation. Manipulation unit 24, glide pad 26, the touch panel, and the like are operated to effect such operations. In a closed state, a snap shot can be taken in a manner similar to that of a digital camera.

Figure 39:
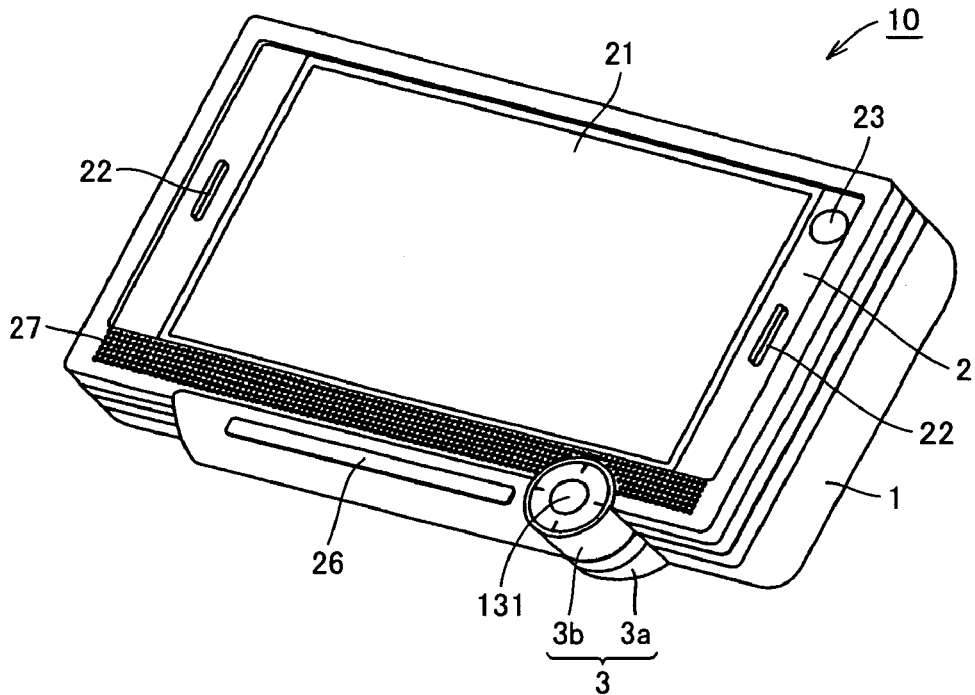
FIGS. 39 and 40 are a perspective view and a right side view, respectively, of the portable information terminal in a closed state of the third embodiment to describe the usage manner.
Figure 40:
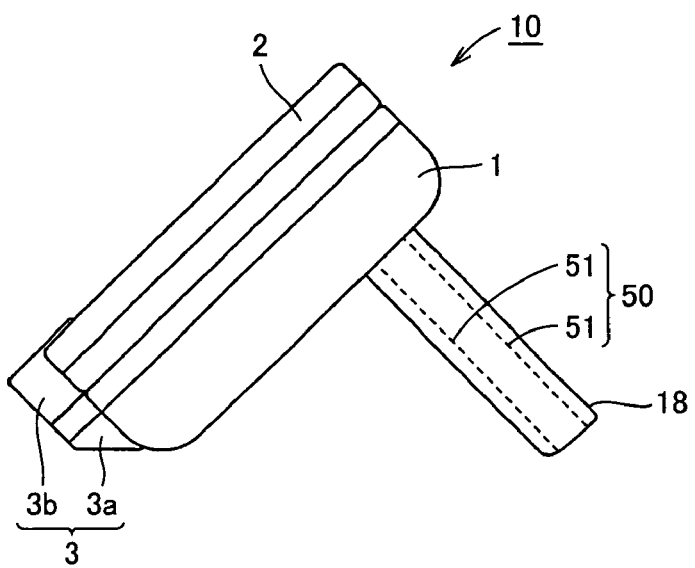

Further in a closed state, portable information terminal 10 can be propped up on a desk, a board, or the like with stand 18 pulled out as shown in FIGS. 39 and 40, to function as a television. Since antenna 50 is disposed in stand 18, the reception sensitivity can be set at the optimum position by altering the angle of stand 18 with respect to the back side of first casing 1 (the propped up angle). Since portable information terminal 10 can be maintained in a propped state through stand 18, television can be enjoyed without having to hold portable information terminal 10 with one's hand.

Figure 41:
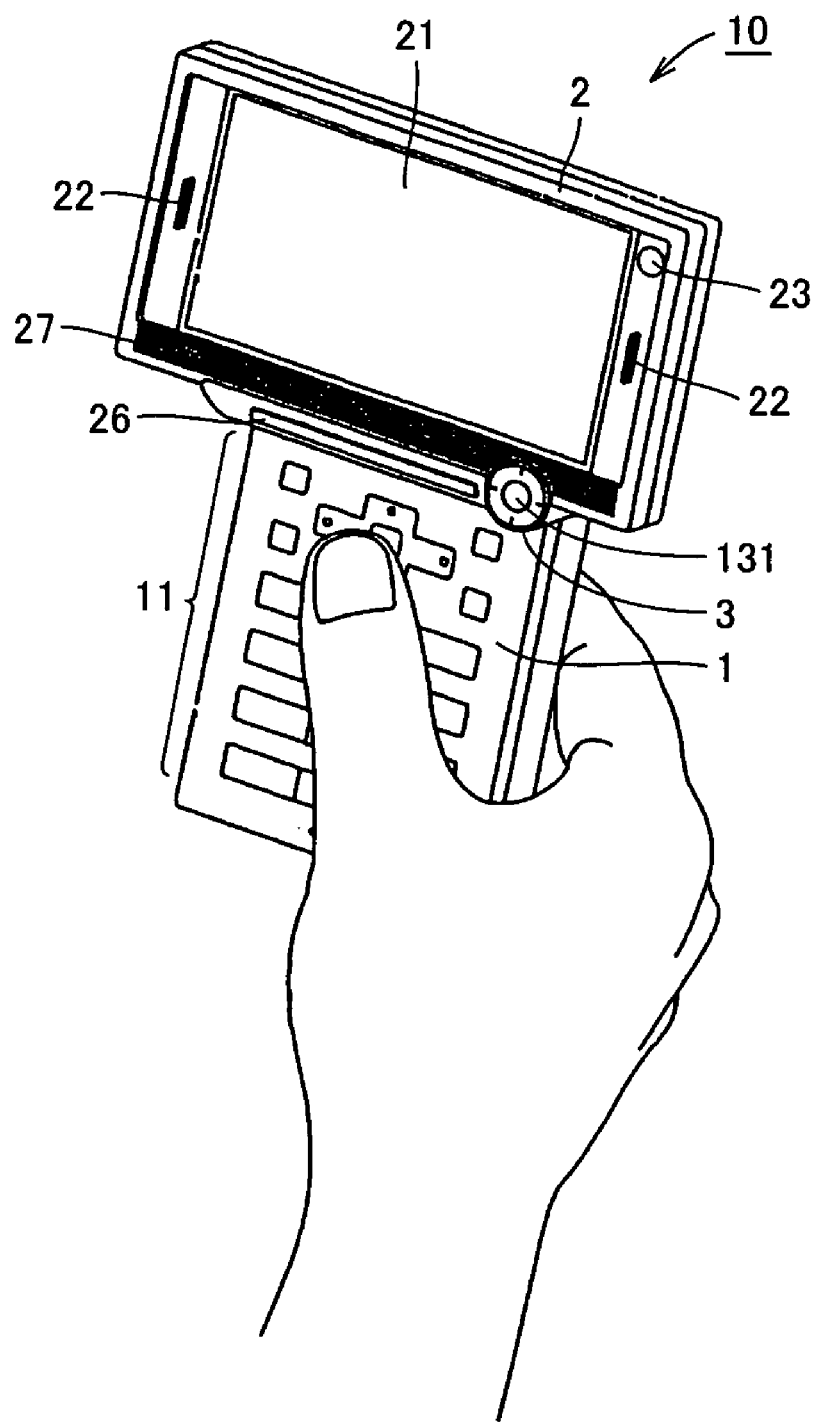
FIG. 41 is a perspective view of the portable information terminal in an open state of the third embodiment to describe the usage manner.

In an open state, the user can hold portable information terminal 10 using first casing 1 as the grip, as shown in FIG. 41, to watch television, or operate various keys on manipulation unit 11 with one's thumb while holding first casing 1 to effect mail, conversation, and the like.

An operation with ease in handling can be conducted using the glide pad in an open state. An exemplified operation using the glide pad will be described hereinafter.

Figure 42:
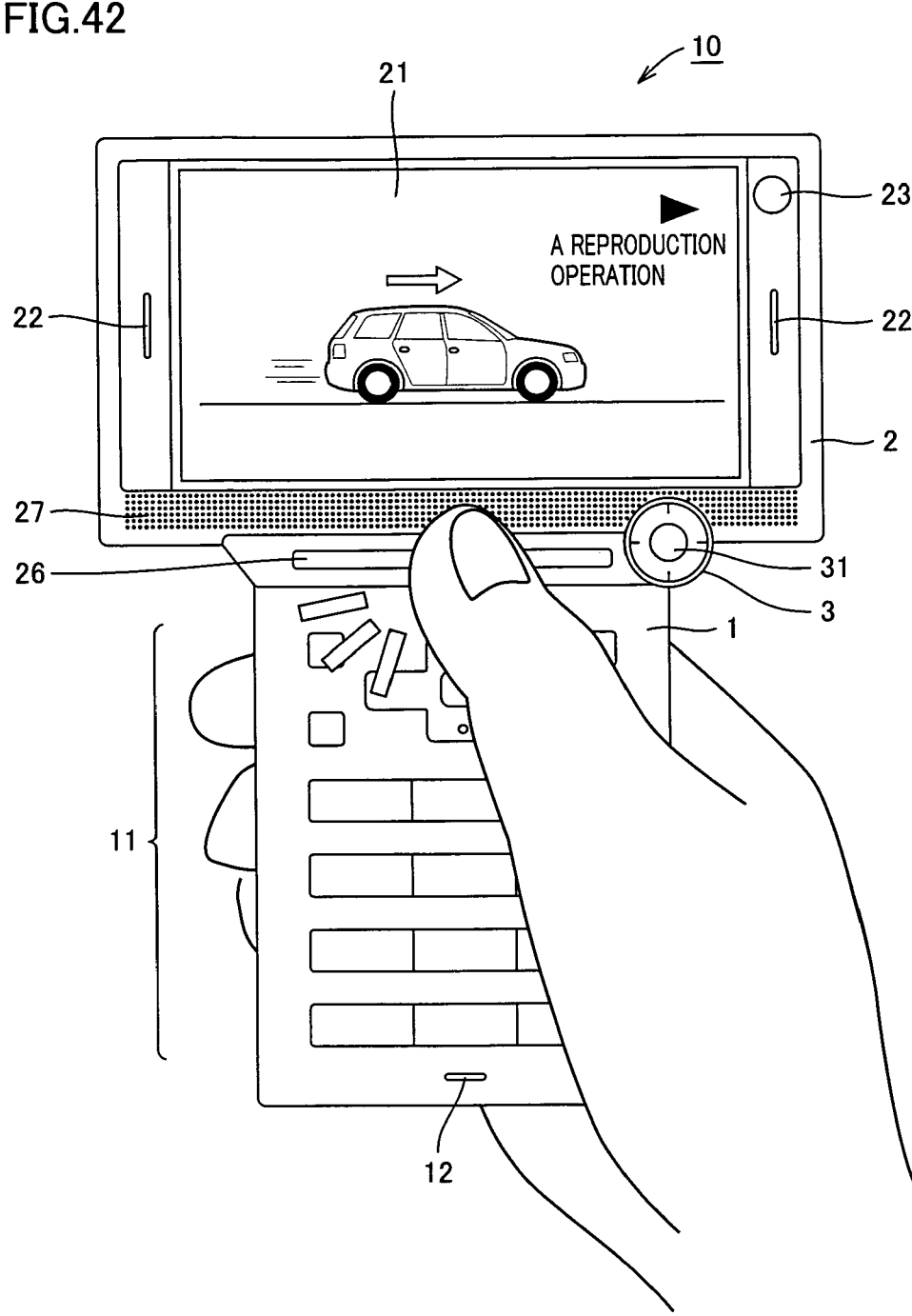
FIGS. 42, 43, 44, 45 and 46 are front views to describe an example of a reproduction operation, a temporary pause operation, a stop operation, a fast-forward operation, and a running back operation, respectively, using a glide pad.
Figure 43:
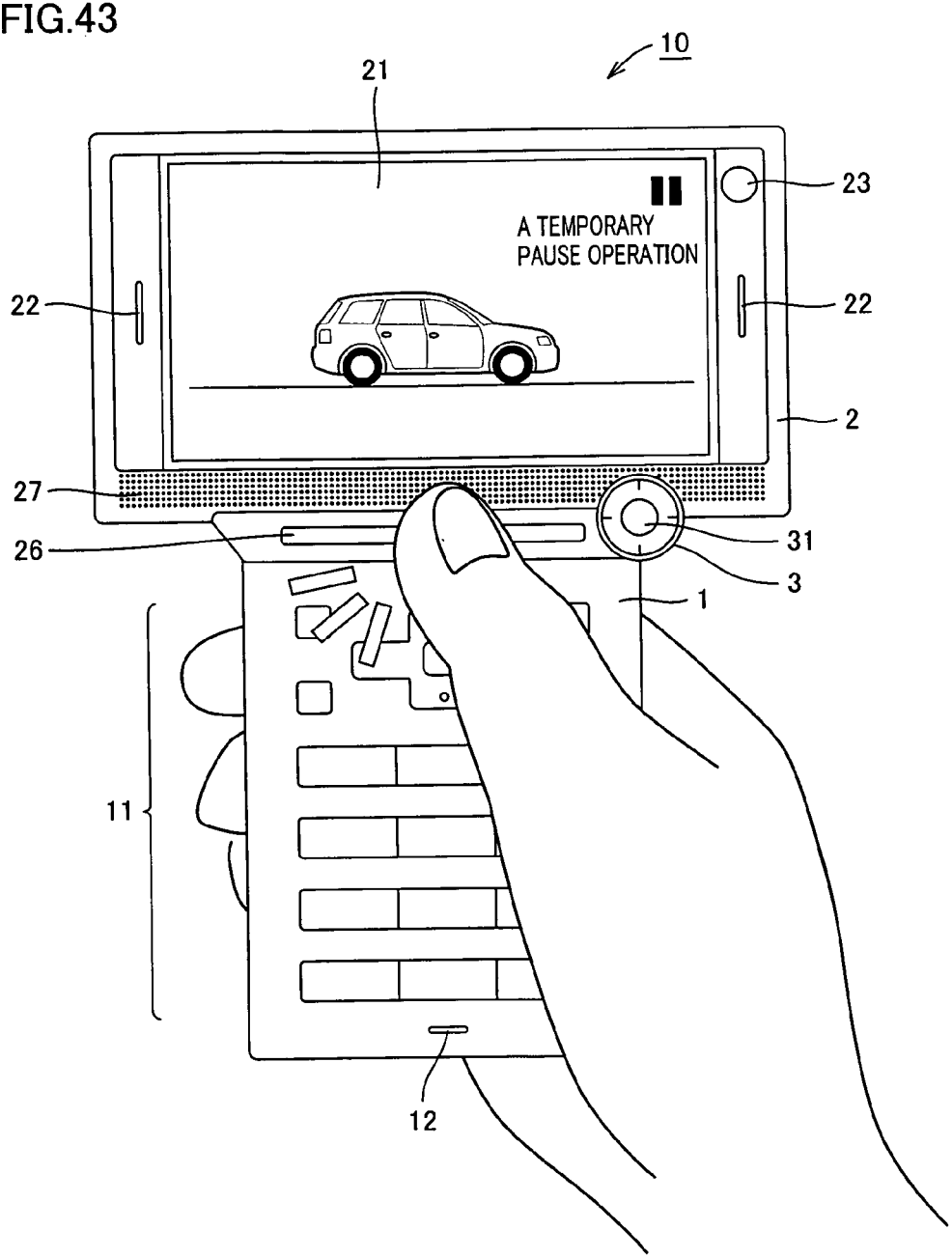
Figure 44:
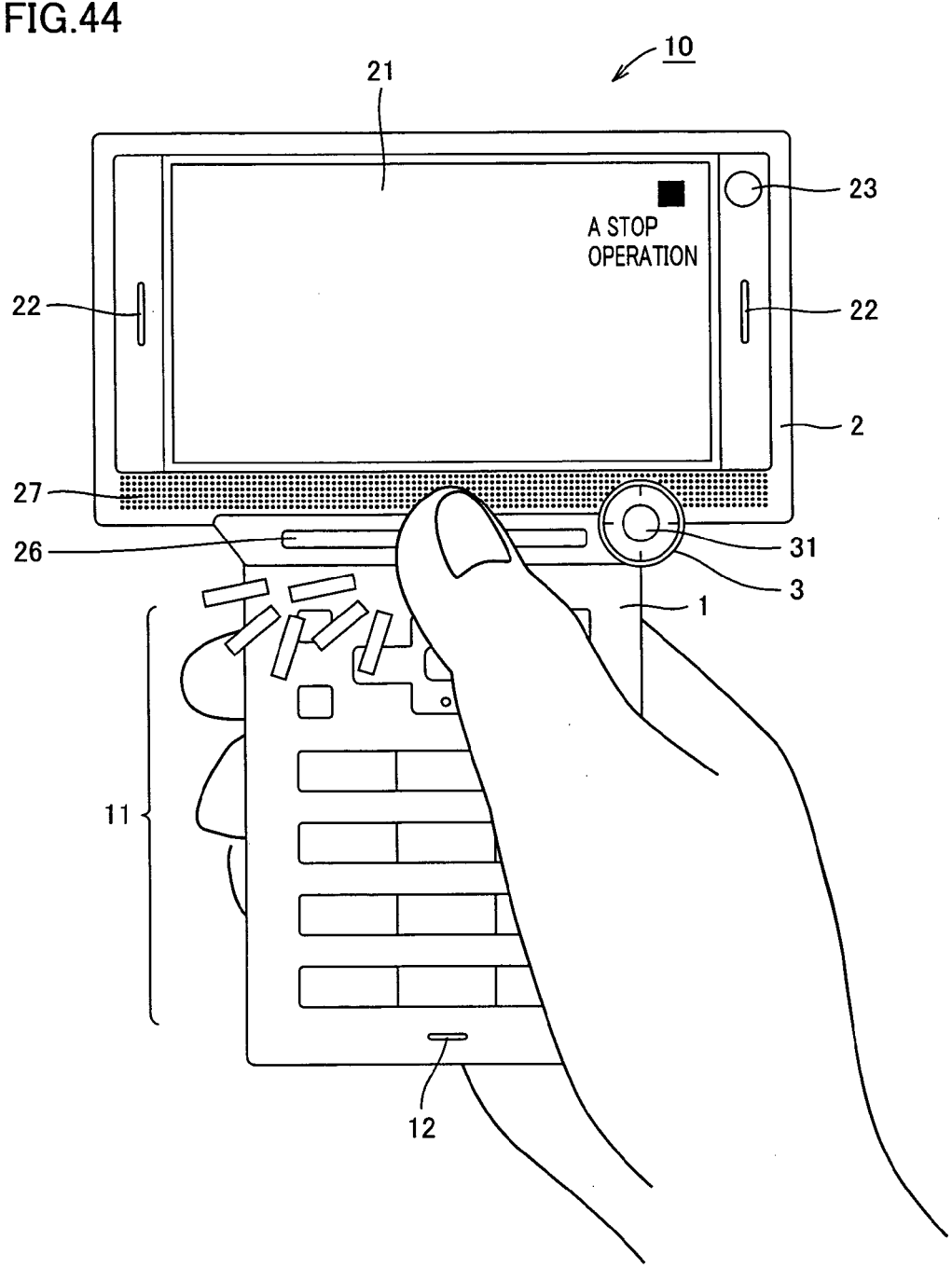

FIG. 42 corresponds to a state where a motion picture (a recording of television, video captured by a camera, an image transmitted accompanying a mail message, contents of a game, or the like) is in a complete or temporary pause state. The user presses glide pad 26 once with his/her finger to resume reproduction of the motion picture. When the user presses glide pad 26 once during the play of a motion picture, the motion picture can be stopped temporarily, as shown in FIG. 43. FIG. 44 corresponds to the case where the motion picture is at a temporary stop or during reproduction. The motion picture can be stopped completely by pressing glide pad 26 twice with his/her finger.

Figure 45:
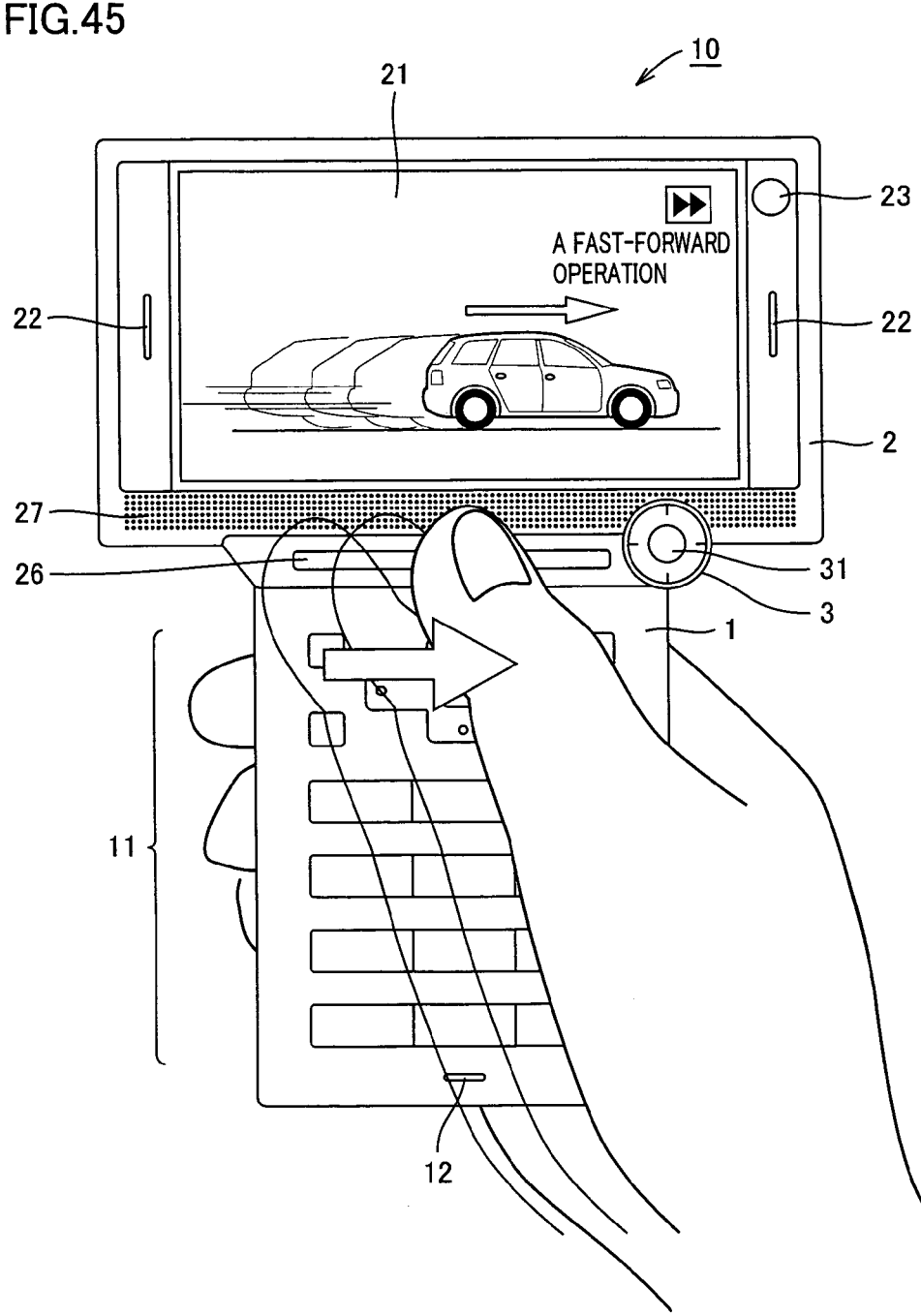

FIG. 45 corresponds to the case where a motion picture is currently reproduced. When the user rubs his/her finger once rightwards against glide pad 26 with his/her finger still in contact with glide pad 26, a fast-forwarding state of the motion picture can be continued until the user takes his/her finger off from glide pad 26. By moving his/her finger off from glide pad 26 from such a state, the motion picture returns to a normal reproduction state.

Figure 46:
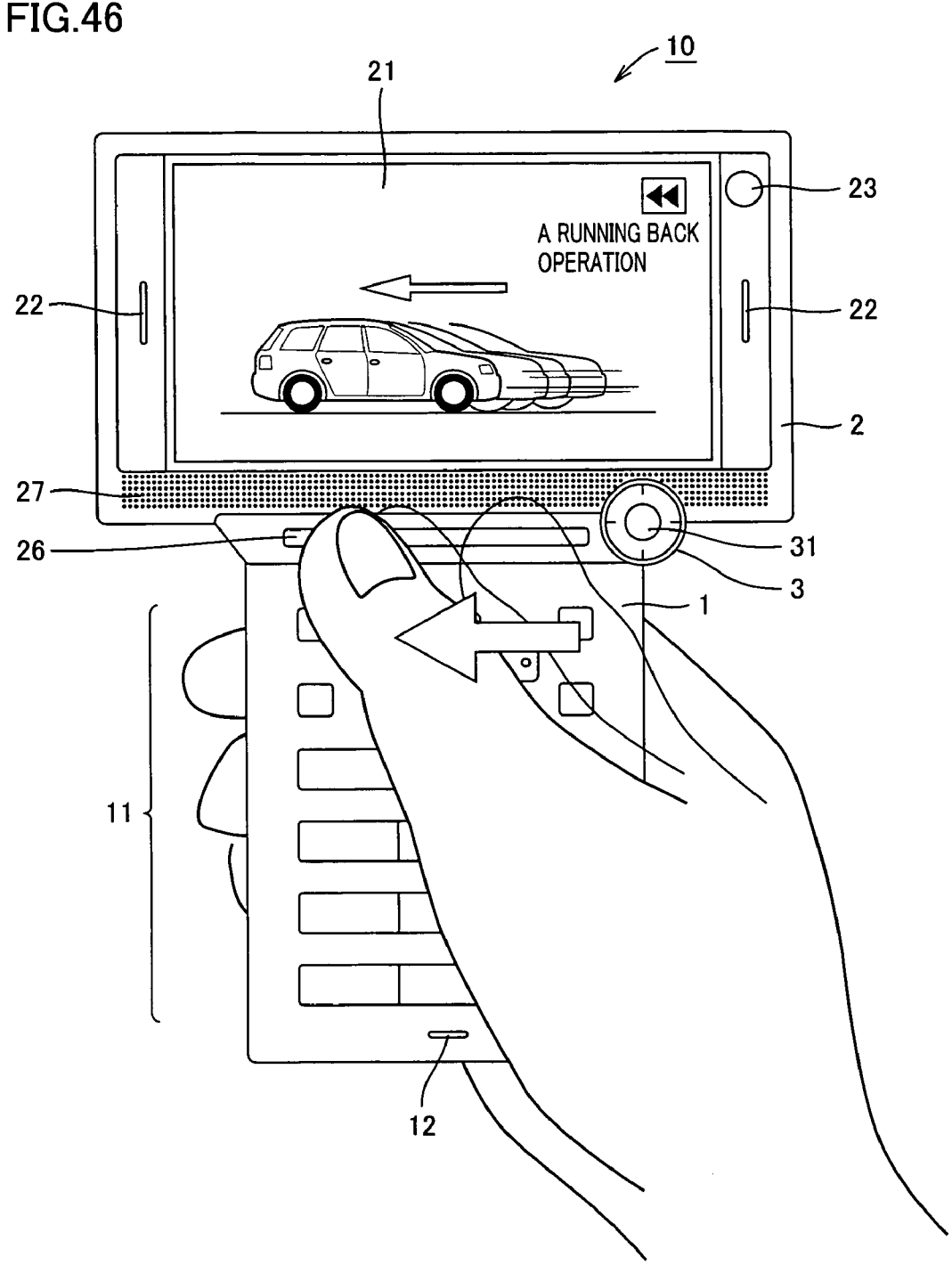

FIG. 46 corresponds to the case where the user rubs his/her finger leftward once against glide pad 26 during reproduction of a motion picture. With the user's fingers still in contact with glide pad 26, the running back state of the motion picture continues until the user takes his/her finger off from glide pad 26. A normal reproduction state of the motion picture can be restored when the user takes his/her finger off from glide pad 26.

Manipulation can be conducted with a natural feel for the user, more conformable to one's sense by such operation through glide pad 26 on a motion picture.

The present embodiment offers advantages similar to those of the first embodiment.

Although the above description is based on the case where the portable information terminal is operated through one's right hand, the portable information terminal can be operated with one's left hand by arranging the rotation linking mechanism at the opposite side (left side).

<Configuration Corresponding to Either-Side Open State>

The above-described first to third embodiments are based on a configuration employing rotation linking mechanism 3 as the rotation shaft. The configuration of rotation linking mechanism 3 is not limited thereto, and may be implemented by a combination of a cam hole and a pin. This configuration is advantageous in that the second casing can be set axially symmetric to the center line of the first casing at a predetermined angle of rotation (for example 90°), irrespective of which direction the second casing is rotated relative to the first casing. Such a configuration will be described hereinafter, identified as a configuration corresponding to an either-side open state.

Figure 47:
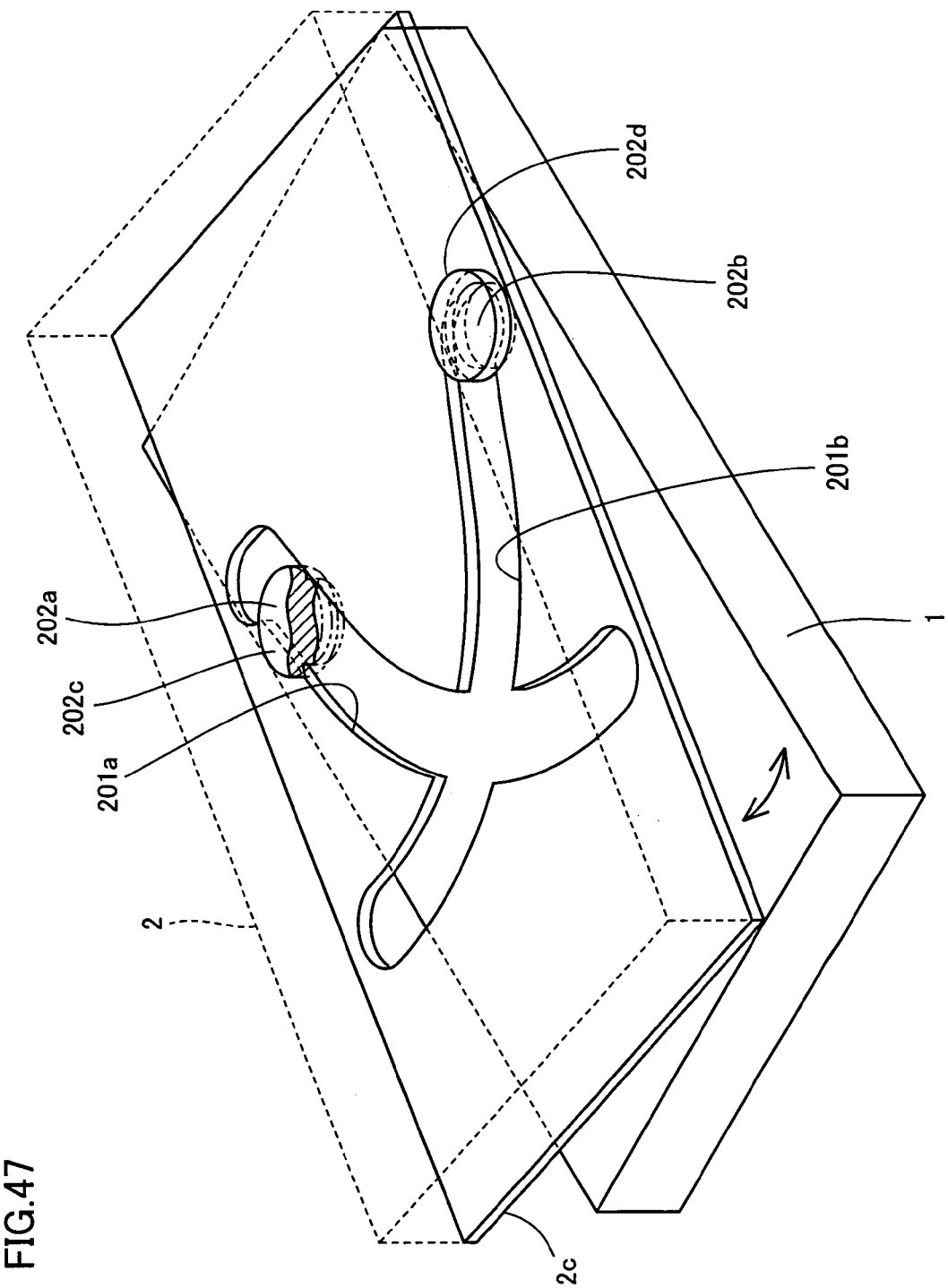
FIG. 47 is a perspective view partially broken away of the portable information terminal schematically showing a configuration corresponding to an either-side open state.

FIG. 47 shows a configuration corresponding to an either-side open structure. The portable information terminal includes two cam openings provided at a bottom plate 2c of second casing 2, i.e. a first cam opening 201 and a second cam opening 201b, and two pins inserted into first cam opening 201a and second cam opening 201b, respectively, i.e. a first pin 201a and a second pin 202b. First and second openings 201a and 201b have a configuration in which two arcuate holes are combined. Each of first and second pins 202a and 202b is fixed to the surface of first casing 1. The leading ends of first pin 202a and second pin 202b include a first flange 202c and second flange 202d, respectively, each increased in diameter. First and second flanges 202c and 202d function to prevent first and second pins 202a and 202b from falling out from cam openings 201a and 201, respectively.

First and second cam openings 201a and 201b can be formed directly at base plate 2c of second casing 2. Alternatively, a flat plate 2c in which first and second cam openings 201a and 201b are formed can be attached to the bottom of second casing 2.

The remaining structure is substantially similar to the structures of the first to third embodiments. Therefore, details of the description thereof will not be provided.

An opening and closing operation corresponding to an either-side opening configuration shown in FIG. 47 will be described hereinafter with reference to FIG. 48.

Figure 48:
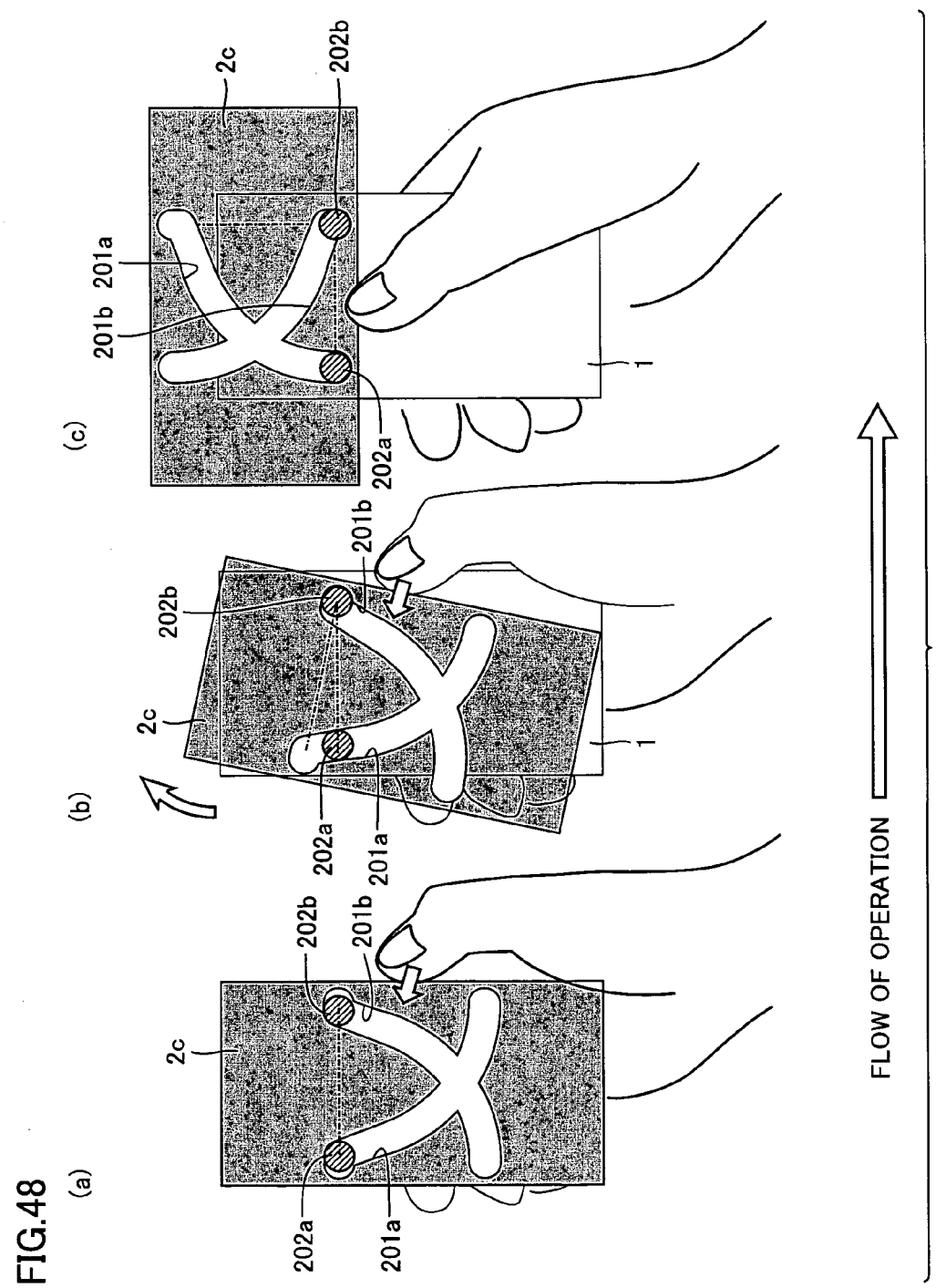
FIGS. 48 and 49 are front views of the portable information terminal to describe the opening/closing operation with the right hand and the left hand, respectively, corresponding to the either-side open state of FIG. 47.

In a closed state, second casing 2 entirely covers the manipulation unit of first casing 1 (FIG. 48 (a)), likewise the first to third embodiments. By pushing up second casing 2 from this state with the thumb of the right hand holding first casing 1, first pin 202a at the left side in the drawing slides along first cam opening 201a, and second casing 2 rotates slidably clockwise about second pin 202b located at the right side in the drawing, with respect to first casing 1. Accordingly, second casing 2 is gradually shifted relative to first casing 1 (FIG. 48 (b)). By rotating second casing 2 90° clockwise in the drawing relative to first casing 1, the manipulation unit (not shown) is exposed and not concealed by second casing 2, that is axially symmetric to the center line of first casing 1. Portable information terminal 10 takes an open state with a T shape in outline (FIG. 48 (c)).

Figure 49:
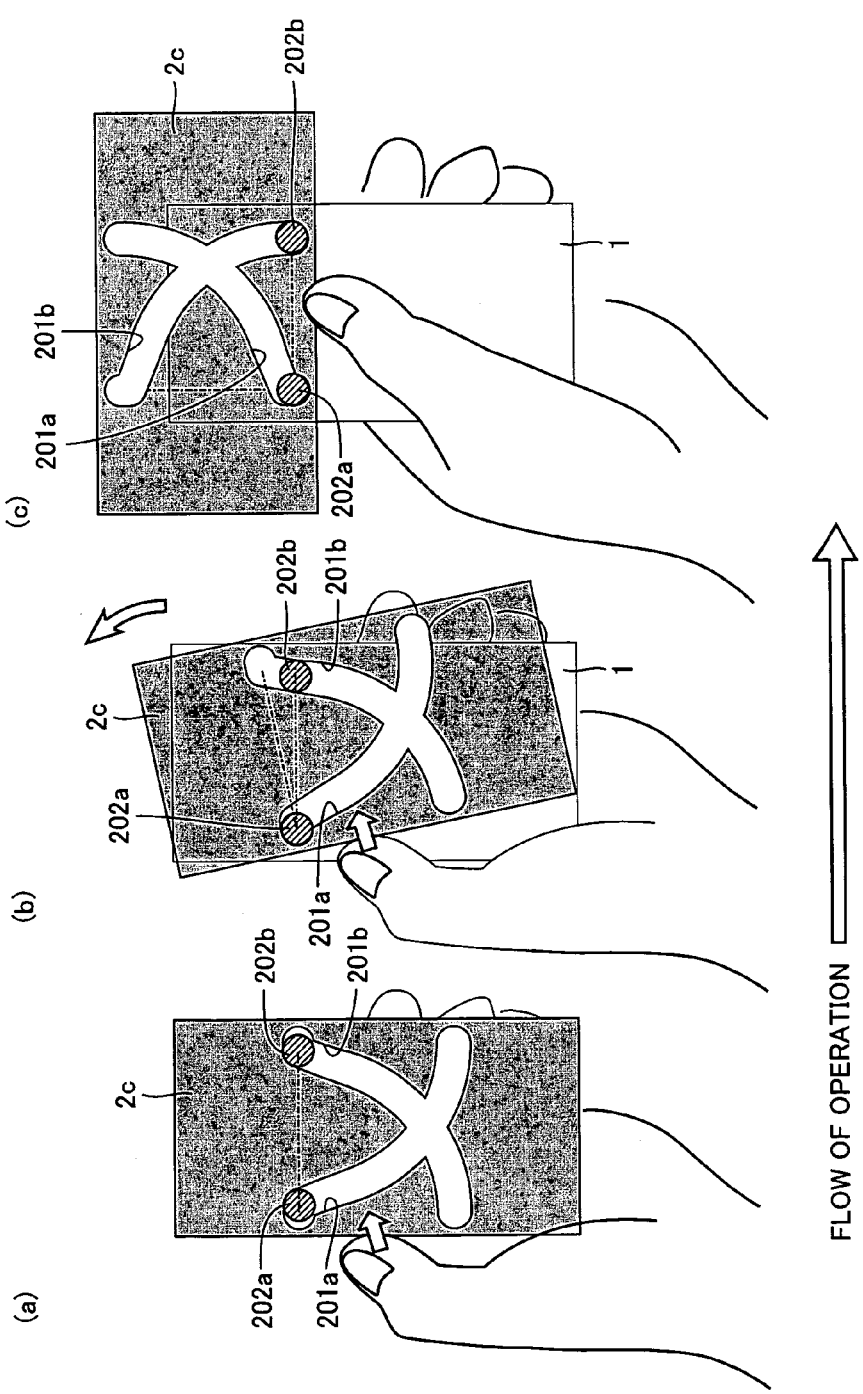

FIG. 49 corresponds to the case where the portable information terminal is held by the left hand. In a closed state, second casing 2 entirely covers the manipulation unit of first casing 1 (FIG. 49 (a)), likewise the first to third embodiments. By pushing second casing 2 with the thumb of the left hand holding first casing 1, second pin 202b at the right side slides along second cam opening 201b, and second casing 2 rotates slidably counterclockwise in the drawing about first pin 202a at the left side with respect to first casing 1. Accordingly, second casing 2 is gradually shifted relative to first casing 1 (FIG. 49 (b)). By rotating second casing 2 90° counterclockwise in the drawing with respect to first casing 1, the manipulation unit (not shown) is exposed and not concealed by second casing 2, that is axially symmetric to the center line of first casing 1. Portable information terminal 10 attains an open state with a T shape in outline (FIG. 49 (c)).

By such a structure corresponding to an either-side opening manner, both a right-handed user and the left-handed user can readily conduct an opening and closing operation.

<Structure Related to Two-Point Support Between First and Second Casings>

Figure 50:
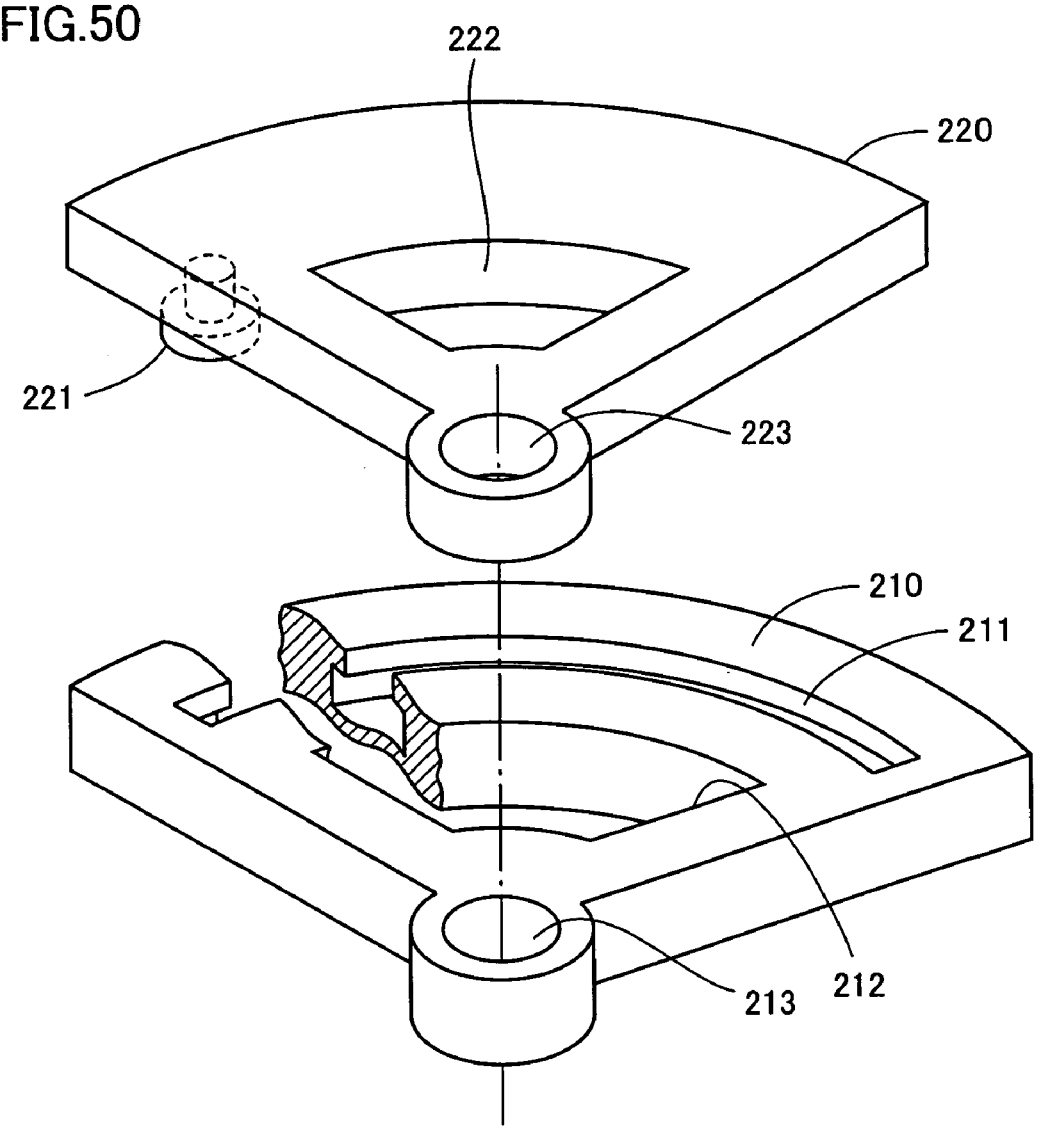
FIG. 50 is a schematic perspective view of the member to support the first and second casings at two points.

The first to third embodiments were described in which first and second casings 1 and 2 are supported by one point of rotation link mechanism 3. It is preferable to improve the supporting strength by supporting first and second casings 1 and 2 on each other. A structure based on a two-point support between first and second casings will be described hereinafter with reference to FIG. 50 corresponding to a partially broken-away perspective view.

The two-point support is implemented by two fan-shaped members 210 and 220. One fan-shaped member 210 has an arcuate rail groove 210 formed at its surface. Fan-shaped member 220 has a pin 221 provided at its surface. Pin 221 is fitted into a rail groove 211 to allow sliding along rail groove 211. The leading end of pin 221 includes a flange increased in diameter to prevent pin 221 from falling out from rail groove 211. Each of members 210 and 220 has a spreading angle of at least 90° such that second casing 2 can rotate at least 90° relative to first casing 1. In the present example, fan-shaped member 220 is formed to have a spreading angle of approximately 90°. Fan-shaped member 210 is formed to have a spreading angle larger than that of member 220.

Both members 210 and 220 are formed with openings 212 and 222 through which a wire bundle for electrical connection between the electrical devices of first and second casings 1 and 2 pass. Members 210 and 220 are also formed with circular holes 213 and 223 through which the rotation shaft of rotation link mechanism 3 passes.

Figure 51:
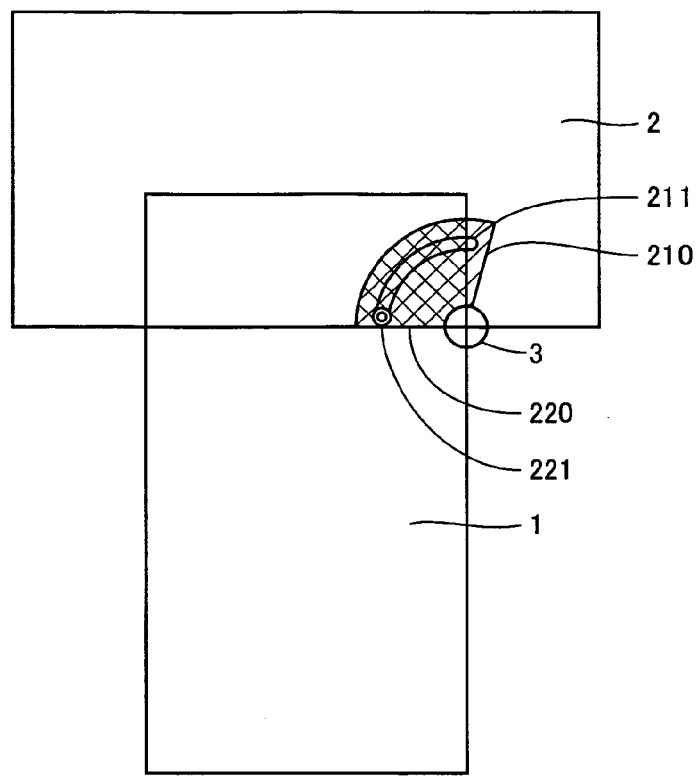
FIGS. 51 and 52 are front views of the portable information terminal in a two-point supported state corresponding to an open state and a closed state, respectively.

Referring to FIG. 51, fan-shaped member 210 (the right climbing hatched portion) is attached to second casing 2, and fan-shaped member 220 (the left climbing hatched portion) is attached to first casing 1.

Figure 52:
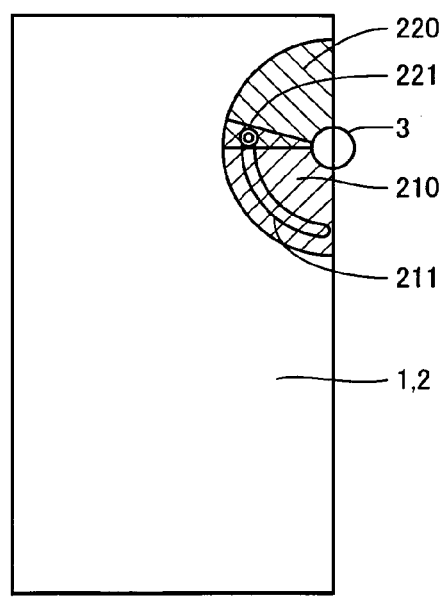
Figure 53:
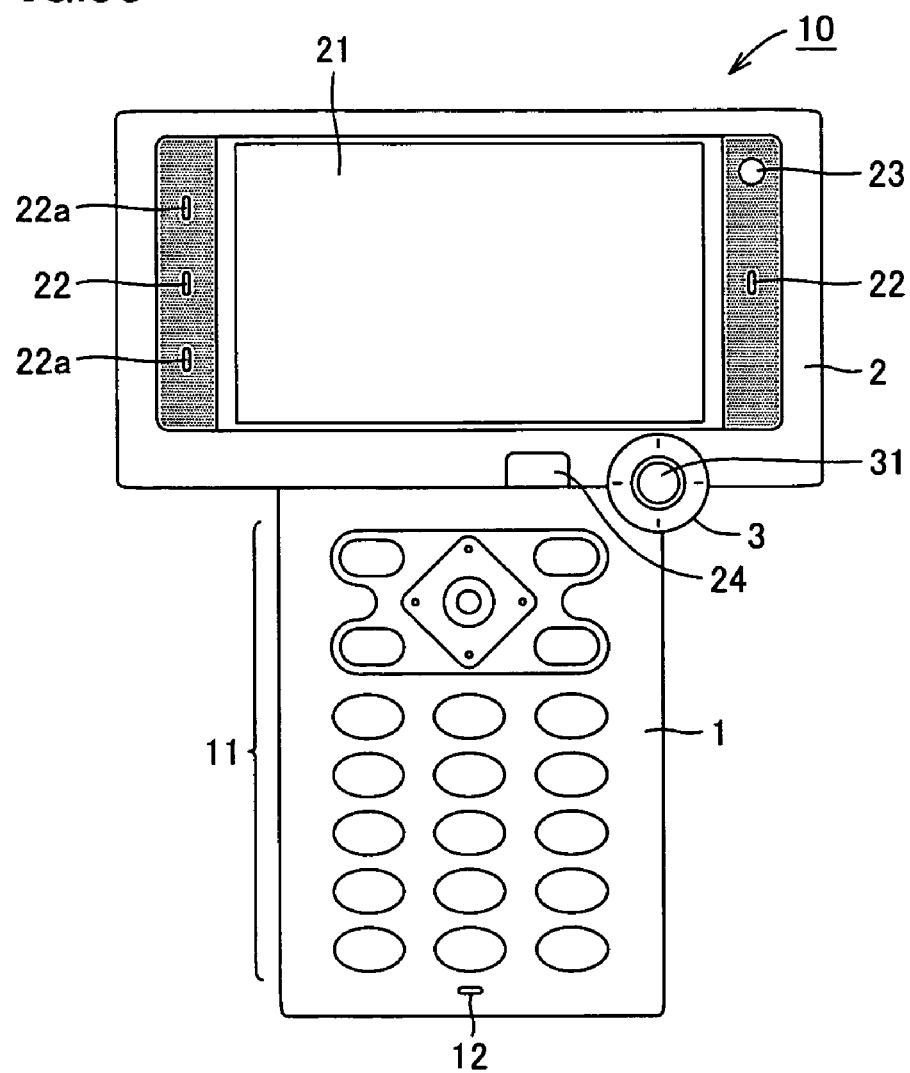
FIGS. 53 and 54 are front views of the portable information terminal corresponding to an open state to describe examples of arrangement of the speakers.

Accordingly, the support strength can be improved since second casing 2 is supported at two points with respect to first casing 1 while allowing 90° rotation with respect to first casing 1 between an open state (FIG. 51) and a closed state (FIG. 52).

The fan-shaped member is dispensable, and rail groove 211 and pin 221 can be provided directly at one and the other of the surface of first casing 1 and the back side of second casing 2.

<Arrangement of Speaker>

The number of speakers 22 arranged is not limited to one at either side in the longer side direction of display unit 22, as described in the second and third embodiments. For example, three speakers 22, 22a, 22a can be arranged in the direction of one of the longer sides of display unit 21. In this case, the audio of portable information terminal 10 can be adapted to be switched such that speakers 22 at the left side and right side of display unit 21 emit sound in the landscape display orientation corresponding to an open state of portable information terminal 10, and sound is emitted from speakers 22a in a portrait display orientation corresponding to a closed state.

Figure 54:
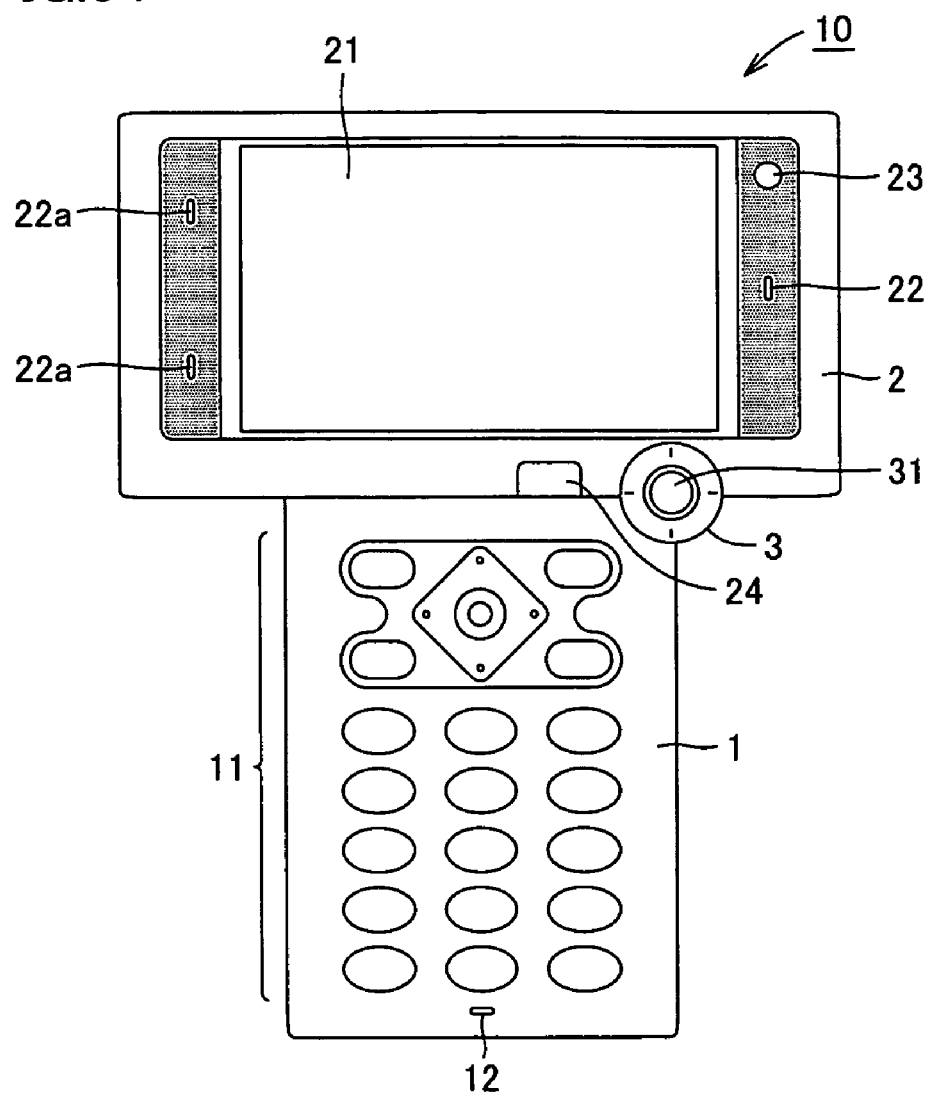

In a similar manner, two speakers 22a may be arranged in the direction of one of the longer sides of display unit 21, as shown in FIG. 54. In this case, the audio of portable information terminal 10 can be adapted to be switched such that speaker 22 at the right side in the drawing of display unit 21 and the two speakers 22a at the left side of display unit 21 emit sound in the landscape display orientation corresponding to an open state of portable information terminal 10, and sound is emitted from speakers 22a in a portrait display orientation corresponding to a closed state Switching Between Portrait and Landscape Orientation In the second and third embodiments, switching between a portrait orientation and a landscape orientation can be conducted as set forth below with reference to FIG. 55 for a still picture photograph function and TV telephone function.

Figure 55:
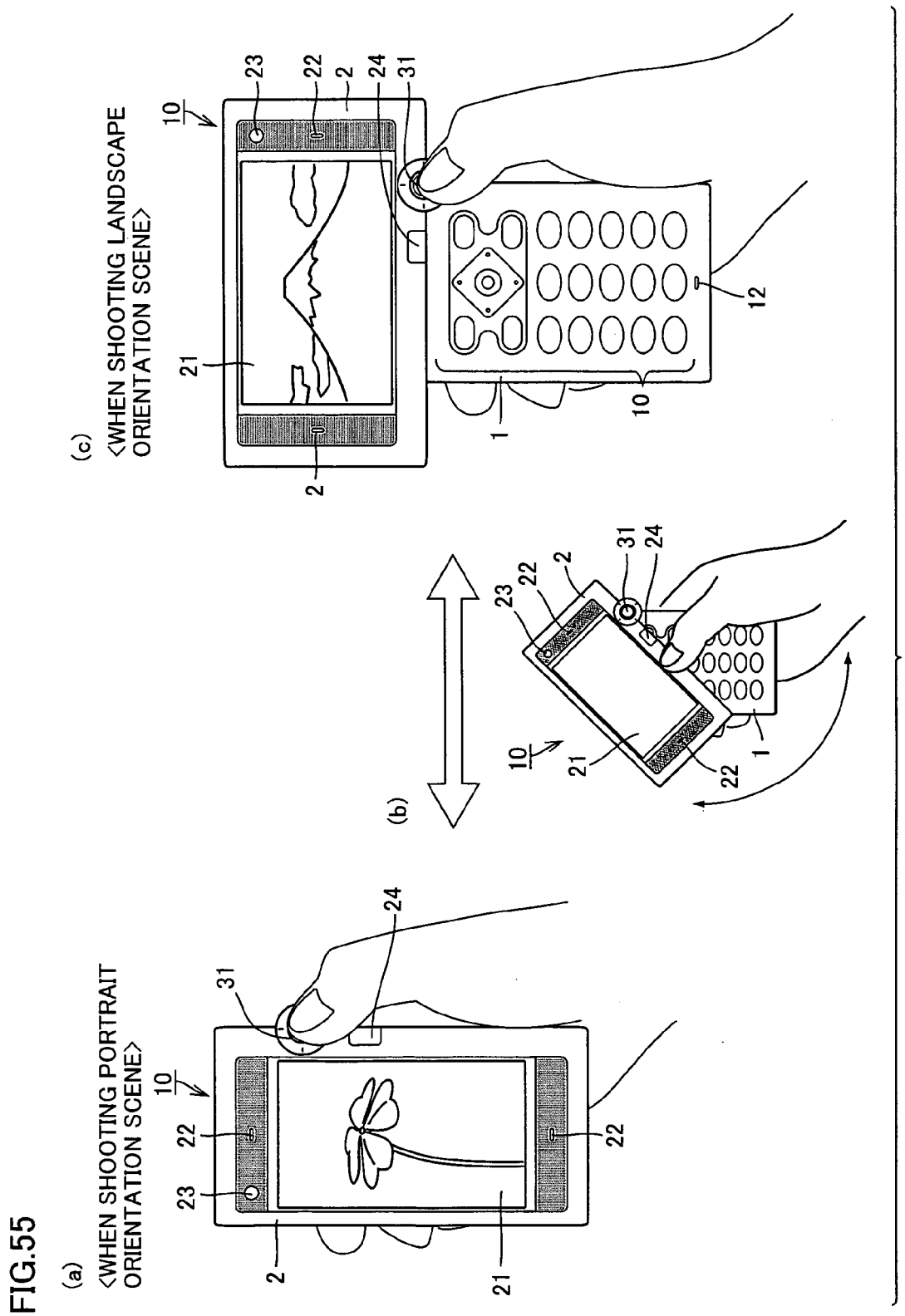
FIG. 55 is a diagram to describe switching of the portrait and landscape orientation display in capturing a still picture.

When a picture of a portrait orientation scene is to be taken, a snap can be shot by pressing cursor key 31 when portable information terminal 10 takes a closed state, as shown in FIG. 55 (a). When a landscape orientation scene is to be taken, second casing 2 is rotated slidably from the state of (a) to the state of (b) in FIG. 55 to allow depression of cursor key 31 with portable information terminal 10 taking an open state, as shown in FIG. 55 (c).

Thus, portable information terminal 10 of the second and third embodiments allows switching between the portrait orientation and landscape orientation for display unit 21 readily with one hand. The user does not have to change his hand that holds portable information terminal 10 in order to take a still picture. The angle of camera 14 or 23 is switched in cooperation with the switching between a landscape orientation and portrait orientation.

Figure 56:
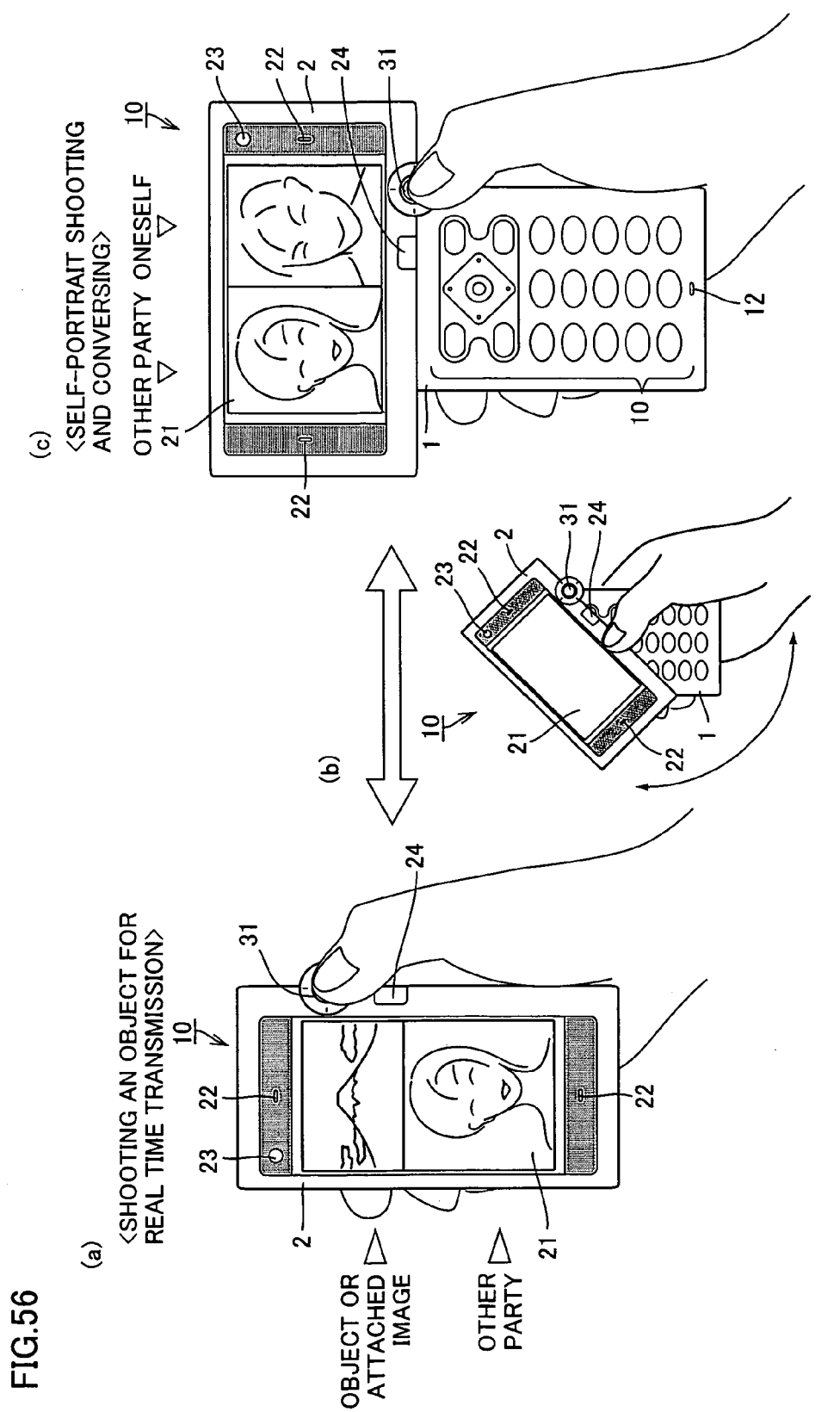
FIG. 56 is a diagram to describe switching of the portrait and landscape orientation display in a television telephone mode.
Figure 57:
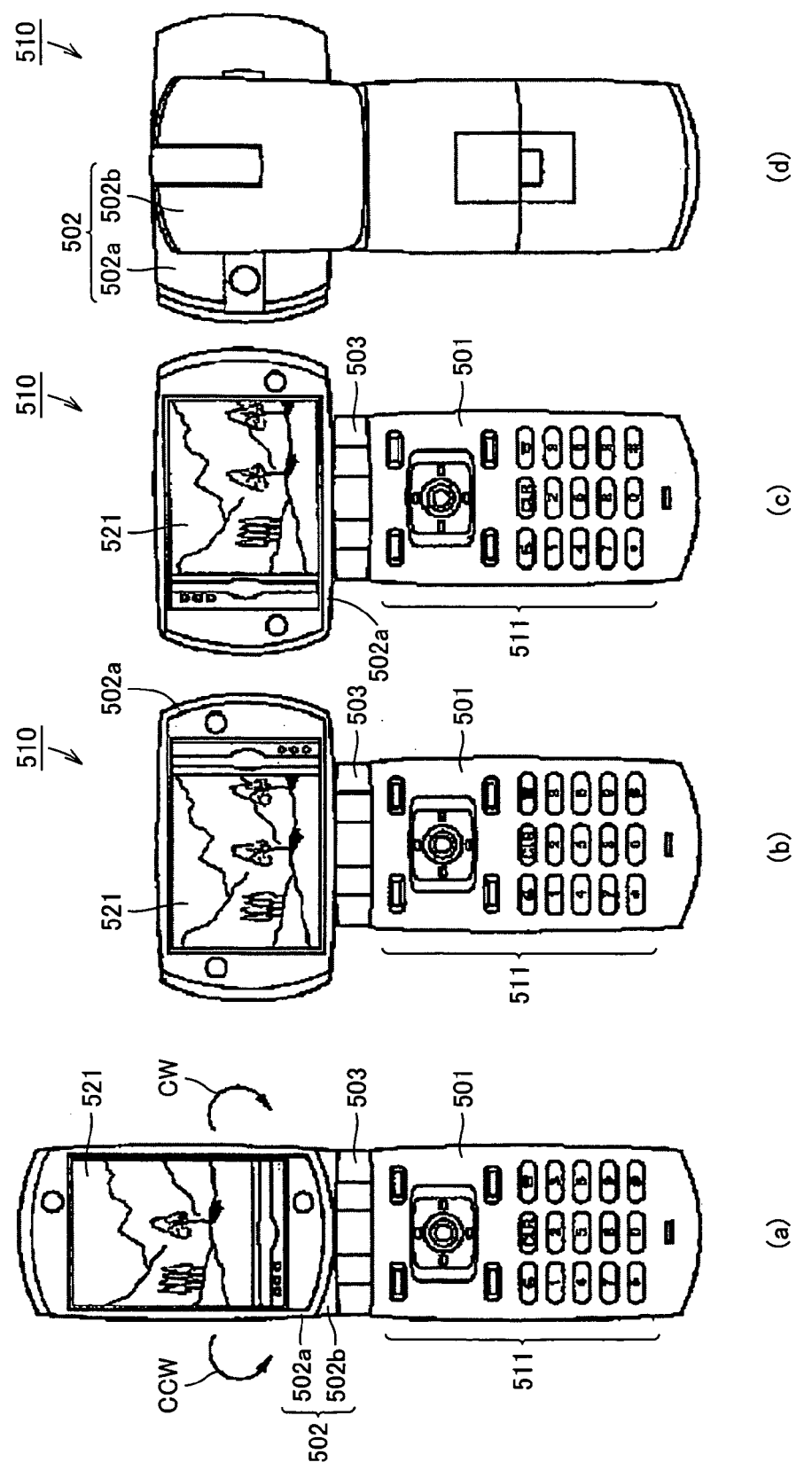
FIG. 57 is a schematic front view of the mobile phone disclosed in Japanese Patent Laying-Open No. 2003-319043.

When the shooting subject or attached image in a portrait orientation and the image of the other party in a portrait orientation are to be displayed at the same time on display unit 21 in the usage of a TV phone, a portrait orientation display can be provided with portable information terminal 10 in a closed state, as shown in FIG. 56 (a). The orientation of display unit 21 can be changed readily with the same one hand, as shown in FIG. 56 (b), when it becomes necessary in accordance with the conversation between the talking parties, as shown in FIG. 56 (b). The arrangement of the split screen on display unit 21 changes in cooperation with this switching in orientation. Two screens in a portrait orientation can be disposed, as shown in FIG. 56 (c). In this case, an image of the other party and a self-portrait image can be juxtaposed, for example.

The present invention was described in which a mobile phone is taken as an example of a portable information terminal. The present invention is not limited thereto, and is applicable to a PDA (Personal Data Assistant), a notebook type personal computer, a digital camera with transmission capability, or the like.

The present invention is particularly advantageous to the application of a portable information terminal in which the display unit is altered between a portrait orientation display and a landscape orientation display, an opening and closing operation method of the portable information terminal, and a display method thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable information terminal comprising:
a first casing including a manipulation unit;
a second casing including a display unit; and
a rotation link mechanism linking said first and second casings such that said second casing rotates slidably by an angle equal to or less than 90° with respect to said first casing,
wherein a rotation center of said rotation link mechanism is located on said first casing on a first phantom line that crosses a longer side of said first casing by an angle of 45°,
said rotation center of said rotation link mechanism is located on said second casing on a second phantom line that crosses a longer side of said second casing by an angle of 45°, and
said first phantom line passes through a point distant from a corner of said first casing along said longer side of said first casing by a distance x obtained by an equation of x=(b−a)/2, where a is a length of a shorter side of said first casing and b is a length of said longer side of said first casing.

2. A portable information terminal comprising:
a first casing including a manipulation unit;
a second casing including a display unit; and
a rotation link mechanism linking said first and second casings such that said second casing rotates slidably by an angle equal to or less than 90° with respect to said first casing,
wherein a rotation center of said rotation link mechanism is located on said first casing on a first phantom line that crosses a longer side of said first casing by an angle of 45°,
said rotation center of said rotation link mechanism is located on said second casing on a second phantom line that crosses a longer side of said second casing by an angle of 45°, and
said second phantom line passes through a point distant from a corner of said second casing along said longer side of said second casing by a distance x obtained by an equation of x=(b−a)/2, where a is a length of a shorter side of said second casing and b is a length of said longer side of said second casing.

* * * * *